(12) United States Patent
Asai

(10) Patent No.: US 9,594,528 B2
(45) Date of Patent: *Mar. 14, 2017

(54) INFORMATION PROCESSING APPARATUS HAVING INTERACTIVE USER INTERFACE FOR MANAGING COOPERATIVE OPERATION BETWEEN PLURAL APPARATUSES

(71) Applicant: Brother Kogyo Kabushiki Kaisha, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,872

(22) Filed: Jun. 30, 2015

(65) Prior Publication Data

US 2015/0378651 A1    Dec. 31, 2015

(30) Foreign Application Priority Data

Jun. 30, 2014   (JP) ................. 2014-134917

(51) Int. Cl.
*G06F 3/12*    (2006.01)
*H04N 1/00*    (2006.01)

(52) U.S. Cl.
CPC ............ *G06F 3/1204* (2013.01); *G06F 3/126* (2013.01); *G06F 3/1288* (2013.01); *H04N 1/00* (2013.01); *G06F 3/1292* (2013.01)

(58) Field of Classification Search
CPC .... G06F 3/1232; G06F 3/1207; G06F 3/1273; G06F 3/1286; G06F 3/1287; G06F 3/1292

(Continued)

(56) References Cited

U.S. PATENT DOCUMENTS 4,991,972 A   2/1991 Ikenoue et al.
6,553,431 B1  4/2003 Yamamoto et al.
(Continued)

FOREIGN PATENT DOCUMENTS

JP    2000-187573 A    7/2000
JP    2000-315182 A    11/2000
(Continued)

OTHER PUBLICATIONS

Aug. 26, 2015—(US) Notice of Allowance—U.S. Appl. No. 14/489,133.

(Continued)

*Primary Examiner* — Benny Q Tieu
*Assistant Examiner* — Juan M Guillermety
(74) *Attorney, Agent, or Firm* — Banner & Witcoff, Ltd.

(57) ABSTRACT

An information processing apparatus, cooperation system and a non-transitory computer-readable recording medium is provided with: a computer-readable program capable of implementing a user interface for easily changing an operation of each apparatus individually while one or more first apparatuses and one or more second apparatuses are cooperatively operating wherein a state of the corresponding change instruction object is switched in correspondence to the progressing status of the operation of each apparatus, it is possible to implement the user interface for easily changing an operation of each apparatus individually.

19 Claims, 13 Drawing Sheets

(58) Field of Classification Search
USPC .............................. 358/1.13, 1.14, 1.15, 1.16
See application file for complete search history.

(56) References Cited

U.S. PATENT DOCUMENTS

| | | |
|---|---|---|
| 6,609,162 B1 | 8/2003 | Shimizu et al. |
| 7,002,702 B1 | 2/2006 | Machida |
| 8,019,853 B2 | 9/2011 | Machida |
| 2002/0184499 A1* | 12/2002 | Taguchi .................. G06F 8/61 |
| | | 713/168 |
| 2005/0055641 A1 | 3/2005 | Machida |
| 2009/0103124 A1 | 4/2009 | Kimura et al. |
| 2014/0268208 A1* | 9/2014 | Hirakata ............... G06F 3/1238 |
| | | 358/1.14 |
| 2014/0376045 A1 | 12/2014 | Oyoshi |
| 2015/0077781 A1 | 3/2015 | Asai |
| 2015/0207942 A1* | 7/2015 | Bakthavachalu .. H04N 1/00204 |
| | | 358/1.15 |

FOREIGN PATENT DOCUMENTS

| | | | |
|---|---|---|---|
| JP | 2004320621 A | 11/2004 | |
| JP | 3787434 B2 | 6/2006 | |

OTHER PUBLICATIONS

May 12, 2015—(US) Non-Final Office Action—U.S. Appl. No. 14/489,133.
Jun. 30, 2015—(US) Co-pending U.S. Appl. No. 14/489,133.

* cited by examiner

FIG. 4

| PROGRESSING STATUS | FIRST APPARATUS | SECOND APPARATUS |
|---|---|---|
| OPERATION STANDBY | C  E | C  E |
| UNDER OPERATION | C | C |
| OPERATION COMPLETED | D | — |
| UNDER SUSPENSION | Re  D | Re |
| CANCEL | Re  E | Re  E |

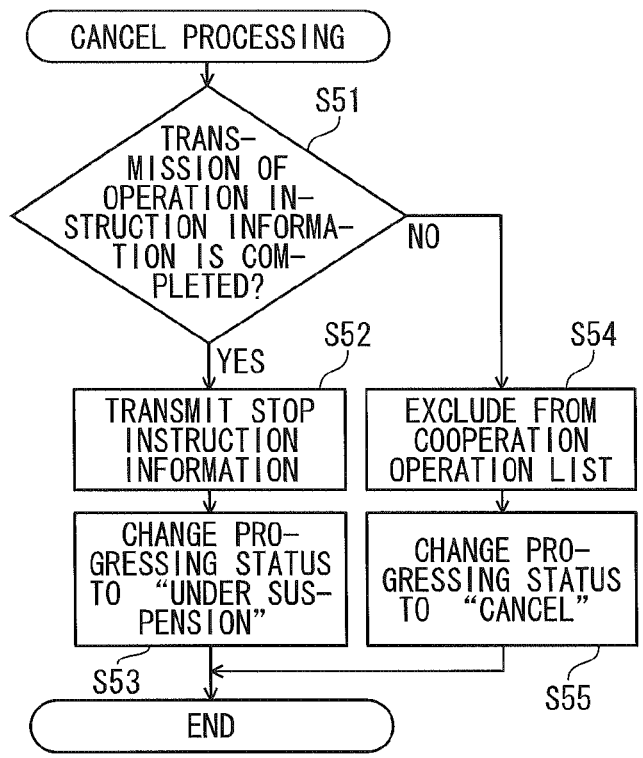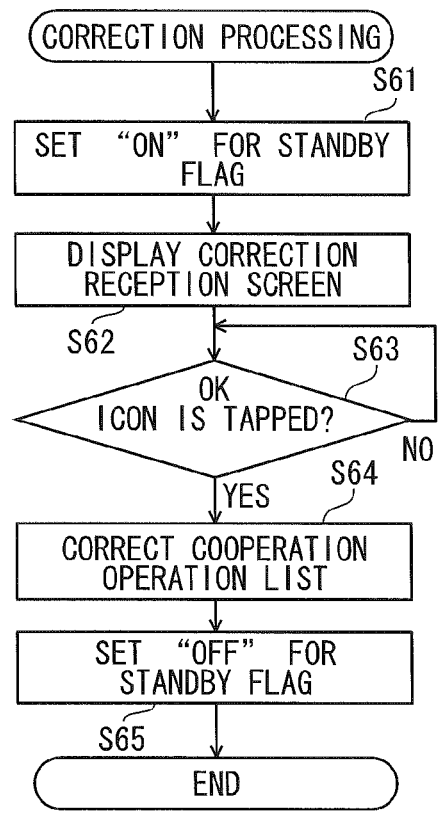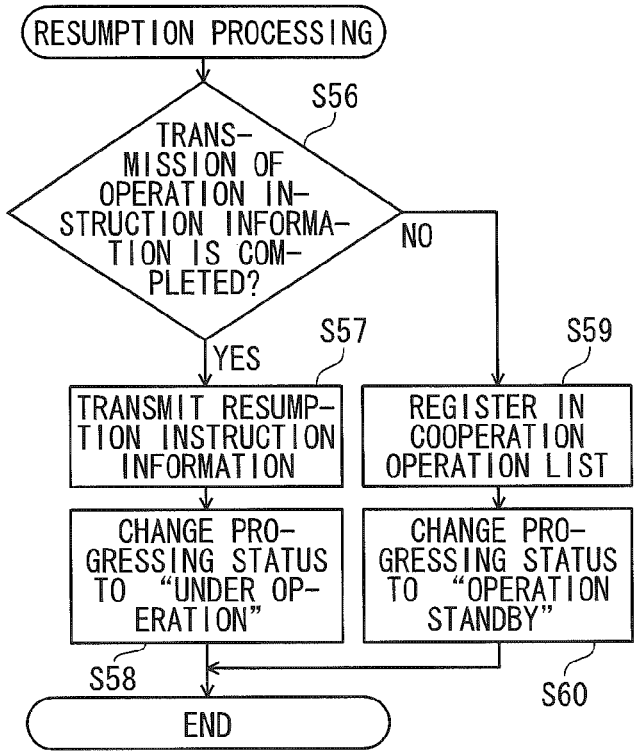

FIG. 10A

| EXECUTION SEQUENCE | APPARATUS ID | OPERATION CONTENT | PROGRESSING STATUS | STANDBY FLAG |
|---|---|---|---|---|
| 1 | SERVER A | DL | OPERATION STANDBY | OFF |
| 2 | MFC-A | SCAN | OPERATION STANDBY | OFF |
| 3 | MFC-B | SCAN | OPERATION STANDBY | OFF |
| 4 | MFC-C | PRINT | OPERATION STANDBY | OFF |

FIG. 10B

| EXECUTION SEQUENCE | APPARATUS ID | OPERATION CONTENT | PROGRESSING STATUS | STANDBY FLAG |
|---|---|---|---|---|
| 1 | SERVER A | DL | UNDER OPERATION | OFF |
| 2 | MFC-A | SCAN | OPERATION STANDBY | OFF |
| 3 | MFC-B | SCAN | OPERATION STANDBY | OFF |
| 4 | MFC-C | PRINT | OPERATION STANDBY | OFF |

FIG. 10C

| EXECUTION SEQUENCE | APPARATUS ID | OPERATION CONTENT | PROGRESSING STATUS | STANDBY FLAG |
|---|---|---|---|---|
| 1 | SERVER A | DL | UNDER OPERATION | OFF |
| - | MFC-A | SCAN | CANCEL | OFF |
| 2 | MFC-B | SCAN | OPERATION STANDBY | OFF |
| 3 | MFC-C | PRINT | OPERATION STANDBY | OFF |

FIG. 10D

| EXECUTION SEQUENCE | APPARATUS ID | OPERATION CONTENT | PROGRESSING STATUS | STANDBY FLAG |
|---|---|---|---|---|
| 1 | SERVER A | DL | OPERATION COMPLETED | OFF |
| - | MFC-A | SCAN | CANCEL | OFF |
| 2 | MFC-B | SCAN | UNDER OPERATION | OFF |
| 3 | MFC-C | PRINT | OPERATION STANDBY | OFF |

FIG. 10E

| EXECUTION SEQUENCE | APPARATUS ID | OPERATION CONTENT | PROGRESSING STATUS | STANDBY FLAG |
|---|---|---|---|---|
| 1 | SERVER A | DL | OPERATION COMPLETED | OFF |
| 2 | MFC-A | SCAN | OPERATION STANDBY | OFF |
| 3 | MFC-B | SCAN | UNDER OPERATION | OFF |
| 4 | MFC-C | PRINT | OPERATION STANDBY | OFF |

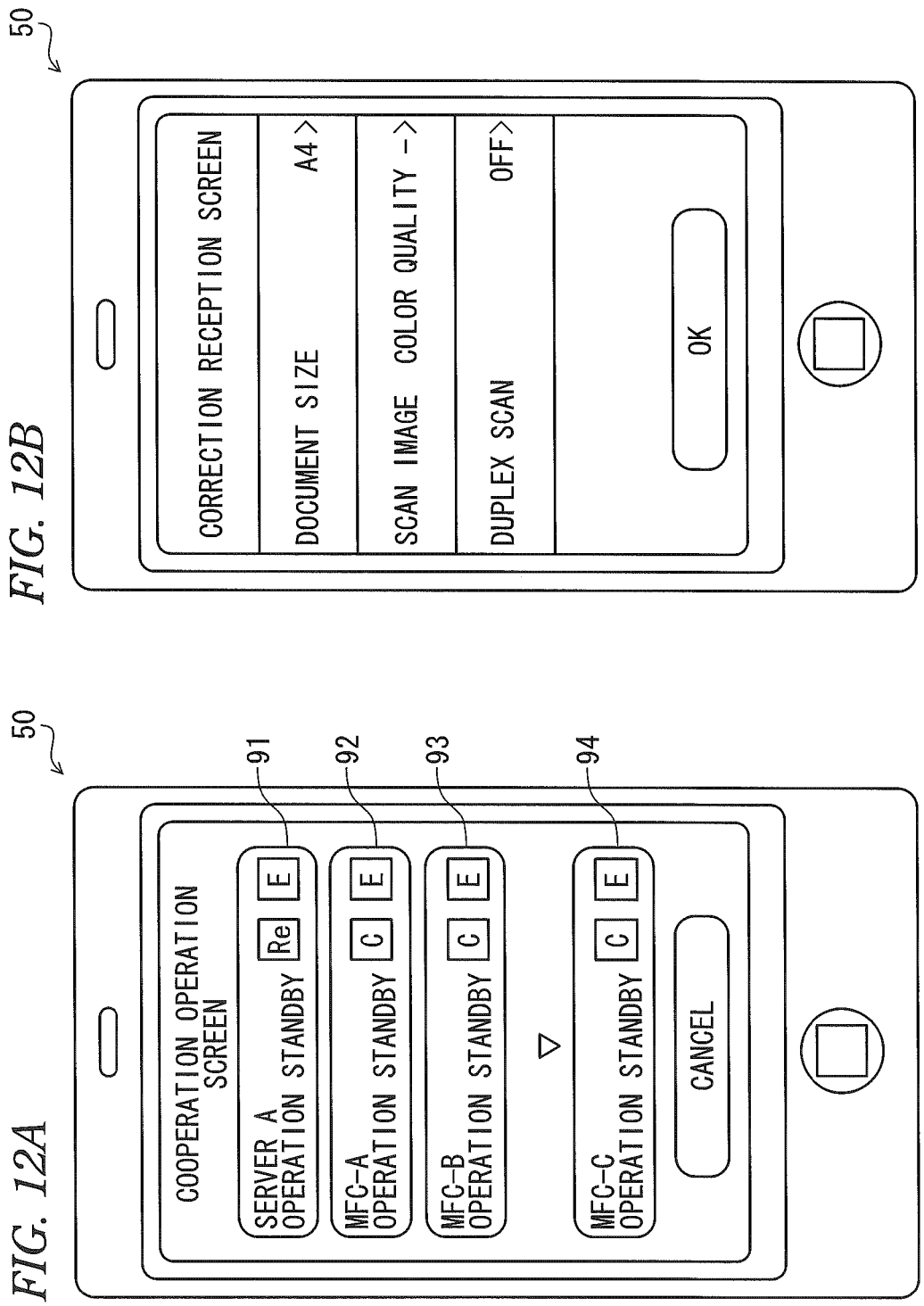

FIG. 13A

| EXECUTION SEQUENCE | APPARATUS ID | OPERATION CONTENT | PROGRESSING STATUS | STANDBY FLAG |
|---|---|---|---|---|
| 1 | SERVER A | DL | UNDER OPERATION | OFF |
| 2 | MFC-A | SCAN | OPERATION STANDBY | OFF |
| 3 | MFC-B | SCAN | OPERATION STANDBY | OFF |
| 4 | MFC-C | PRINT | OPERATION STANDBY | OFF |

FIG. 13B

| EXECUTION SEQUENCE | APPARATUS ID | OPERATION CONTENT | PROGRESSING STATUS | STANDBY FLAG |
|---|---|---|---|---|
| 1 | SERVER A | DL | UNDER OPERATION | OFF |
| 2 | MFC-A | SCAN | OPERATION STANDBY | OFF |
| 3 | MFC-B | SCAN | OPERATION STANDBY | OFF |
| 4 | MFC-C | PRINT | OPERATION STANDBY | OFF |

FIG. 13C

| EXECUTION SEQUENCE | APPARATUS ID | OPERATION CONTENT | PROGRESSING STATUS | STANDBY FLAG |
|---|---|---|---|---|
| 1 | SERVER A | DL | UNDER OPERATION | OFF |
| 2 | MFC-A | SCAN | OPERATION STANDBY | ON |
| 3 | MFC-B | SCAN | OPERATION STANDBY | OFF |
| 4 | MFC-C | PRINT | OPERATION STANDBY | OFF |

FIG. 13D

| EXECUTION SEQUENCE | APPARATUS ID | OPERATION CONTENT | PROGRESSING STATUS | STANDBY FLAG |
|---|---|---|---|---|
| 1 | SERVER A | DL | UNDER OPERATION | OFF |
| 2 | MFC-A | SCAN | OPERATION STANDBY | OFF |
| 3 | MFC-B | SCAN | OPERATION STANDBY | OFF |
| 4 | MFC-C | PRINT | OPERATION STANDBY | OFF |

# INFORMATION PROCESSING APPARATUS HAVING INTERACTIVE USER INTERFACE FOR MANAGING COOPERATIVE OPERATION BETWEEN PLURAL APPARATUSES

CROSS-REFERENCE TO RELATED APPLICATION

This application claims priorities from Japanese Patent Application No. 2014-134917 filed on Jun. 30, 2014, the entire subject matters of which is incorporated herein by reference.

TECHNICAL FIELD

The present disclosure relates to a computer program for operating a plurality of apparatuses in cooperation with each other.

BACKGROUND

In the related art, an information processing apparatus has been known which is configured to operate (hereinafter, referred to as 'cooperation operation') one or more input apparatuses and one or more output apparatuses selected from a plurality of devices connected to a network in cooperation with each other. The information processing apparatus is configured to download target data from a storage server, which is an example of the input apparatus, and to enable a printer, which is an example of the output apparatus, to record an image represented by the target data on a recording sheet. An example of such apparatus is disclosed in JP-A-2000-187573.

In a case where a number of apparatuses relating to the cooperation operation increases, a possibility that an unnecessary apparatus may be selected or a false operation may be set for an apparatus increases. However, since a progressing status of an operation of each apparatus is changed every moment, it may be difficult to specify an apparatus of which an operation can be cancelled or an apparatus of which an operation setting can be corrected.

SUMMARY

The present disclosure has been made in view of the above circumstances, and one of the objects of the present disclosure is to provide a program capable of implementing a user interface for easily changing an operation of each apparatus individually while one or more first apparatuses and one or more second apparatuses are cooperatively operating.

According to an illustrative embodiment of the present disclosure, there is provided a non-transitory computer-readable recording medium storing computer-readable instructions for an information processing apparatus including a display, a processor, a user interface that receives an operation by a user, and a communication interface that communicates with a plurality of apparatuses including a first apparatus and a second apparatus. The information processing apparatus performs a cooperation operation to instruct the first apparatus to execute a first operation and, after the first operation of the first apparatus, to instruct the second apparatus to execute a second operation, the first operation of the first apparatus including transmitting target data to the information processing apparatus, the second operation of the second apparatus including receiving the target data from the information processing apparatus. The computer-readable instructions, when executed by the processor, cause the information processing apparatus to perform: receiving a start instruction by the user through the user interface; acquiring cooperation operation information including a plurality of pieces of operation information, each of the pieces of operation information indicating an apparatus selected from the apparatuses including the first apparatus and the second apparatus and an operation to be executed by the selected apparatus, and execution sequence of each of the operations indicated by each of the pieces of the operation information; transmitting, when determining that the start instruction is received, a plurality of pieces of operation instruction information through the communication interface to each of the apparatuses according to the execution sequence of each of the operations included in the cooperation operation information, each of the pieces of the operation instruction information corresponding to each of the pieces of the operation information and instructing the selected apparatus to execute the operation indicated by each of the pieces of the operation information; controlling the display to display a status screen including status images and change instruction objects, each of the status images representing progressing statuses of the operations to be executed by the first apparatus and the second apparatus, each of the change instruction objects corresponding to each of the apparatuses including the first apparatus and the second apparatus and being displayed to be selectable for receiving a change instruction to change the operations to be executed by each of the apparatuses; receiving the change instruction by the user through the user interface by accepting a selection of the change instruction object; and changing, when determining that the change instruction is received, the operation or the execution sequence of the operation corresponding to the selected change instruction object. In controlling the display to display the status screen, the computer-readable program causes the information processing apparatus to perform: controlling the display to display each of the change instruction objects to be selectable for a time period after the start instruction is received through the user interface until the operation instruction information is transmitted to each of the apparatuses corresponding to each of the change instruction objects, controlling the display to display, when determining that the target data is received from the first apparatus, the change instruction objects corresponding to the first apparatus to be unselectable, and controlling the display to display, when determining that the target data is transmitted to the second apparatus, the change instruction objects corresponding to the second apparatus to be unselectable.

According to another illustrative embodiment of the present disclosure, there is provided an information processing apparatus including: a display; a processor; a user interface that receives an operation by a user; a communication interface that communicates with a plurality of apparatuses including a first apparatus and a second apparatus; and memory storing computer-readable instructions, when executed by the processor, causing the information processing apparatus to perform a cooperation operation to instruct the first apparatus to execute a first operation and, after the first operation of the first apparatus, to instruct the second apparatus to execute a second operation, the first operation of the first apparatus including transmitting target data to the information processing apparatus, the second operation of the second apparatus including receiving the target data from the information processing apparatus. The cooperation operation includes: receiving a start instruction by the user through the user interface; acquiring cooperation operation information including a plurality of pieces of operation information, each of the pieces of operation information indicating an apparatus selected from the apparatuses including the first apparatus and the second apparatus and an operation to be executed by the selected apparatus, and execution sequence of each of the operations indicated by each of the pieces of the operation information; transmitting, when determining that the start instruction is received, a plurality of pieces of operation instruction information through the communication interface to each of the apparatuses according to the execution sequence of each of the operations included in the cooperation operation information, each of the pieces of the operation instruction information corresponding to each of the pieces of the operation information and instructing the selected apparatus to execute the operation indicated by each of the pieces of the operation information; controlling the display to display a status screen including status images and change instruction objects, each of the status images representing progressing statuses of the operations to be executed by the first apparatus and the second apparatus, each of the change instruction objects corresponding to each of the apparatuses including the first apparatus and the second apparatus and being displayed to be selectable for receiving a change instruction to change the operations to be executed by each of the apparatuses; receiving the change instruction by the user through the user interface by accepting a selection of the change instruction object; and changing, when determining that the change instruction is received, the operation or the execution sequence of the operation corresponding to the selected change instruction object. In controlling the display to display the status screen, the computer-readable program causes the information processing apparatus to perform: controlling the display to display each of the change instruction objects to be selectable for a time period after the start instruction is received through the user interface until the operation instruction information is transmitted to each of the apparatuses corresponding to each of the change instruction objects; controlling the display to display, when determining that the target data is received from the first apparatus, the change instruction objects corresponding to the first apparatus to be unselectable; and controlling the display to display, when determining that the target data is transmitted to the second apparatus, the change instruction objects corresponding to the second apparatus to be unselectable.

According to still another illustrative embodiment of the present disclosure, there is provided a cooperation system including: a first apparatus selected from among a plurality of apparatuses; a second apparatus selected from among the apparatuses; and an information processing apparatus that controls a cooperation operation that is executed in cooperation with the first apparatus and the second apparatus. The cooperation operation includes instructions for the first apparatus to execute a first operation and, after the first operation of the first apparatus, instructions for the second apparatus to execute a second operation, the first operation of the first apparatus including transmitting target data to the information processing apparatus, the second operation of the second apparatus including receiving the target data from the information processing apparatus. The information processing apparatus includes: a display; a processor; a user interface that receives an operation by a user; a communication interface that communicates with a plurality of apparatuses including a first apparatus and a second apparatus; and memory storing computer-readable instructions, when executed by the processor, causing the information processing apparatus to perform: receiving a start instruction by the user through the user interface; acquiring cooperation operation information including a plurality of pieces of operation information, each of the pieces of operation information indicating an apparatus selected from the apparatuses including the first apparatus and the second apparatus and an operation to be executed by the selected apparatus, and execution sequence of each of the operations indicated by each of the pieces of the operation information; transmitting, when determining that the start instruction is received, a plurality of pieces of operation instruction information through the communication interface to each of the apparatuses according to the execution sequence of each of the operations included in the cooperation operation information, each of the pieces of the operation instruction information corresponding to each of the pieces of the operation information and instructing the selected apparatus to execute the operation indicated by each of the pieces of the operation information; controlling the display to display a status screen including status images and change instruction objects, each of the status images representing progressing statuses of the operations to be executed by the first apparatus and the second apparatus, each of the change instruction objects corresponding to each of the apparatuses including the first apparatus and the second apparatus and being displayed to be selectable for receiving a change instruction to change the operations to be executed by each of the apparatuses; receiving the change instruction by the user through the user interface by accepting a selection of the change instruction object; and changing, when determining that the change instruction is received, the operation or the execution sequence of the operation corresponding to the selected change instruction object. In controlling the display to display the status screen, the computer-readable program causes the information processing apparatus to perform: controlling the display to display each of the change instruction objects to be selectable for a time period after the start instruction is received through the user interface until the operation instruction information is transmitted to each of the apparatuses corresponding to each of the change instruction objects; controlling the display to display, when determining that the target data is received from the first apparatus, the change instruction objects corresponding to the first apparatus to be unselectable; and controlling the display to display, when determining that the target data is transmitted to the second apparatus, the change instruction objects corresponding to the second apparatus to be unselectable.

BRIEF DESCRIPTION OF THE DRAWINGS

In the accompanying drawings:

FIGS. 2A and 2B are schematic views illustrating a multi function device 10 and a portable device 50, wherein FIG. 2A is a block diagram of a multi function device 10, and wherein FIG. 2B is a block diagram of the portable device 50;

FIG. 4 illustrates a correspondence relation between a progressing status of an operation and an icon displayed on a cooperation operation screen;

FIGS. 6A-6C are examples of processing, wherein FIG. 6A is a flowchart of cancel processing, FIG. 6B is a flowchart of resumption processing, and FIG. 6C is a flowchart of correction processing;

FIGS. 7A and 7B illustrate display examples of a display 53, wherein FIG. 7A illustrates a cooperation operation selection screen, and FIG. 7B illustrates a cooperation operation screen at the time that the cooperation operation starts;

FIGS. 8A and 7B illustrate display examples of the display 53, wherein FIG. 8A illustrates a cooperation operation screen at the time that an operation of a server A starts.

FIGS. 9A and 9B illustrate display examples of the display 53, wherein FIG. 9A illustrates a cooperation operation screen at the time that an operation of an apparatus MFC-B starts, and FIG. 9B illustrates a cooperation operation screen at the time that the operation of an apparatus MFC-B is reregistered;

FIGS. 10A-10E show examples of a cooperation operation list, wherein FIGS. 10A-10EA corresponds to a sequence of step S31, FIGS. 10A-10EB corresponds to a sequence of step S32, FIGS. 10A-10EC corresponds to a sequence of step S35, FIGS. 10A-10ED corresponds to a sequence of step S37, and FIGS. 10A-10EE corresponds to a sequence of step S40;

FIG. 12A-12B illustrate display examples of the display 53, wherein FIG. 12A illustrates a cooperation operation screen at the time that the operation of the server A is stopped, and FIG. 12B illustrates a correction reception screen; and FIG. 13A-13D show other examples of the cooperation operation list, wherein FIG. 13A corresponds to a sequence of step S71, FIG. 13B corresponds to a sequence of step S75, FIG. 13C corresponds to a sequence of step S61, and FIG. 13D corresponds to a sequence of step S65.

DETAILED DESCRIPTION

Hereinafter, an illustrative embodiment of the present disclosure will be described in detail with reference to the drawings. According to an illustrative embodiment, which will be described later, is just an example of the present disclosure, and the illustrative embodiment of the present disclosure can be appropriately changed without changing the gist of the present disclosure.

Figure 1:
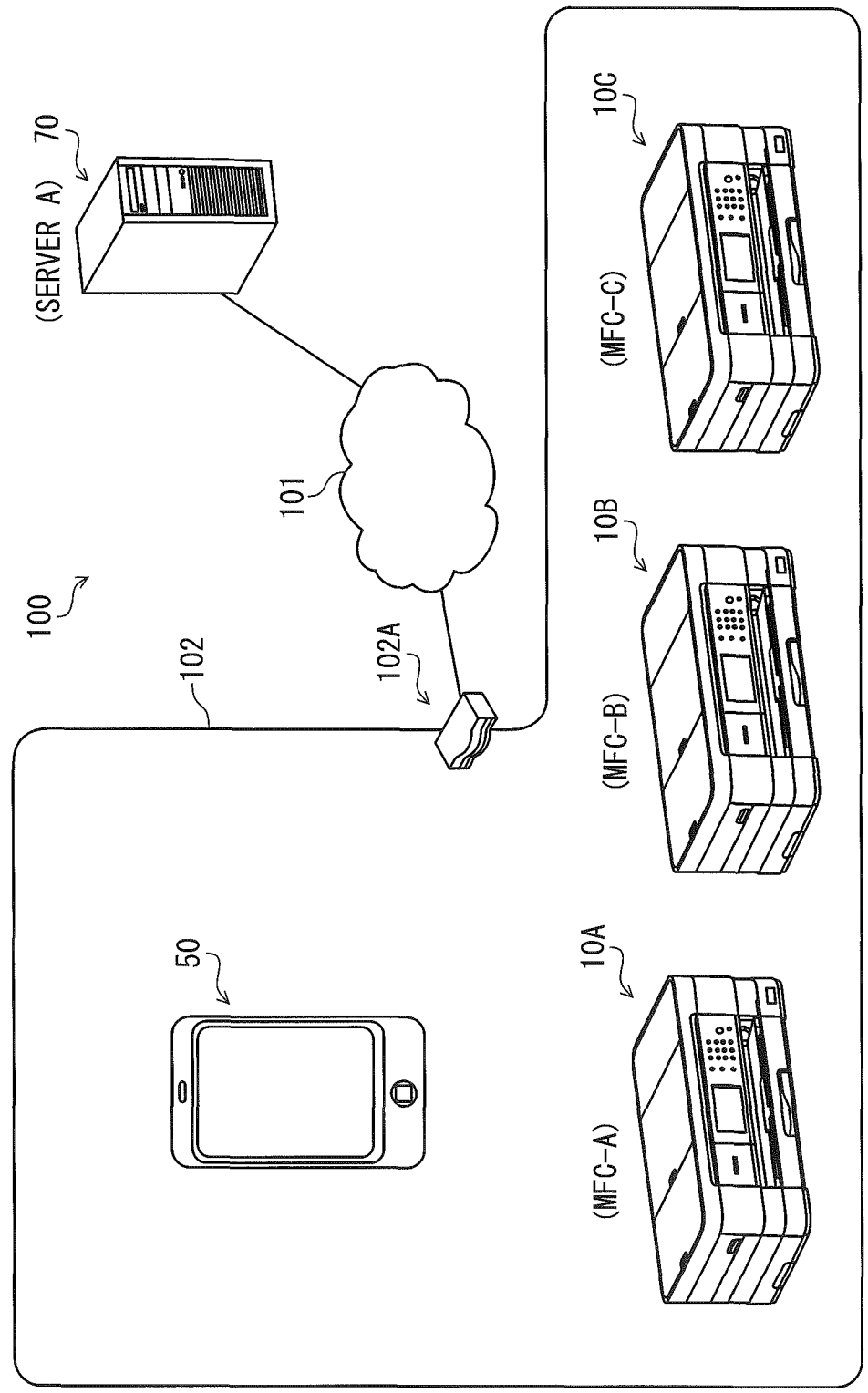
FIG. 1 is a schematic view of a cooperation system 100 of an illustrative embodiment.

FIG. 1 is a schematic view of a cooperation system 100 of an illustrative embodiment. The cooperation system 100 shown in FIG. 1 includes one or more multi function devices 10A, 10B, 10C (hereinafter, also collectively referred to as 'multi function device 10'), a portable device 50, and one or more server apparatuses 70. The multi function devices 10A, 10B, 10C, the portable device 50 and the server apparatus 70 are configured to perform communication with each other through a communication network. Although a specific example of the communication network is not particularly limited, the communication network of this illustrative embodiment includes the Internet 101, and a LAN (abbreviation of Local Area Network) 102 connected to the Internet 101.

In the example of FIG. 1, the LAN 102 is connected to the Internet 101 through a router 102A and the like. Also, the multi function device 10 and the portable device 50 belong to the LAN 102, and the server apparatus 70 is connected to the Internet 101. In this disclosure, the description 'belonging to the LAN 102' means, for example, that a setting for belonging to the LAN 102 is made for an apparatus, the apparatus can perform communication with another apparatus belonging to the LAN 102, more specifically, the apparatus is provided with a network address assigned to the LAN 102.

The multi function devices 10A, 10B, 10C and the server apparatus 70 are assigned with apparatus IDs for uniquely identifying the respective apparatuses. In this illustrative embodiment, an apparatus ID of the multi function device 10A is "MFC-A", an apparatus ID of the multi function device 10B is "MFC-B", an apparatus ID of the multi function device 10C is "MFC-C", and an apparatus ID of the server apparatus 70 is "server A". The multi function devices 10A, 10B, 10C and the server apparatus 70 are examples of the plurality of apparatuses.

The apparatus included in the cooperation system 100 is not limited to the multi function device 10 and the server apparatus 70, and may be a dedicated machine such as a FAX apparatus, a printer, a 3D printer, a label printer, a sewing machine, a machine tool, a scanner, a camera and the like. In the meantime, the multi function device 10 and server apparatus 70 of the specific examples of the apparatus are examples of the apparatus that can be any of a first apparatus and a second apparatus, which will be described later. Also, the FAX apparatus, the scanner and the camera are examples of the apparatus that can be only the first apparatus. The printer, the 3D printer, the label printer, the sewing machine and the machine tool are examples of the apparatus that can be only the second apparatus.

Figure 2A:
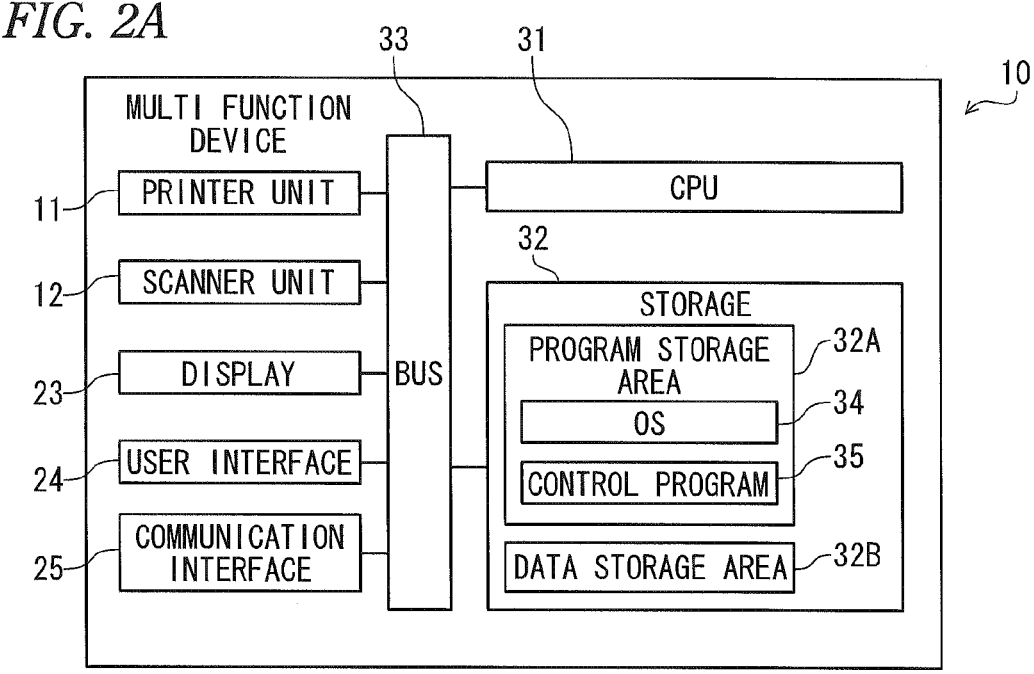

As shown in FIG. 2A, the multi function device 10 mainly has a printer unit 11, a scanner unit 12, a display 23, a user interface 24, a communication interface 25, a processor (hereinafter, also referred to as CPU) 31, a storage 32 and a communication bus 33. The respective elements configuring the multi function device 10 are connected to each other via the communication bus 33. The configurations of the multi function devices 10A, 10B, 10C may be common or may be partially different.

The printer unit 11 is configured to execute recording processing of recording an image represented by image data onto a recording sheet. Although a recording method of the printer unit 11 is not particularly limited, a well-known method such as an inkjet method and an electrophotographic method may be adopted. The scanner unit 12 is configured to execute scan processing of reading an image recorded on a recording sheet and generating image data. The multi function device 10 may further have a FAX function of transmitting and receiving facsimile data, a copy function of reading an image recorded on a recording sheet and recording the same onto another recording sheet, and the like.

The display 23 has a display screen for displaying a variety of information. Although a specific configuration of the display 23 is not particularly limited, a liquid crystal display (hereinafter, also referred to as LCD), an organic electro-luminescence display (hereinafter, also referred to as OELD) and the like may be adopted.

The user interface 24 is configured to receive a user's operation of selecting an object displayed on the display screen of the display 23. Specifically, the user interface 24 has push buttons, for example, and is configured to output a variety of operation signals associated with the pressed push buttons to the CPU 31. Further, the user interface 24 may have a film-shaped touch sensor superimposed on the display screen of the display 23. That is, the display 23 may be configured as a touch panel display. As the touch sensor, a well-known method such as an electrostatic capacitance type, a resistance film type and the like may be adopted.

Herein, the term 'object' indicates an image that can be selected by a user's operation on the user interface 24. For example, the object is a character string displayed on the display 23. When a direction key of the user interface 24 is pressed, one of the objects may be highlighted, and when an enter button of the user interface 24 is pressed, the highlighted object may be selected. As another example, when the user interface 24 is configured as a touch panel, the object may be an icon, a button, a link and the like displayed on the display 23, and the object displayed on a tap position may be selected.

The communication interface 25 is an interface for performing communication with an external apparatus through the communication network. In the illustrative embodiment, the communication interface 25 is configured to perform communication with an external apparatus, based on the TCP/IP (abbreviation of Transmission Control Protocol/Internet Protocol) protocol. That is, the multi function device 10 is configured to transmit a variety of information to the portable device 50 through the communication interface 25 and to receive a variety of data or information from the portable device 50 through the communication interface 25.

The CPU 31 is configured to control an entire operation of the multi function device 10. The CPU 31 is configured to acquire and execute a variety of programs from the storage 32, based on the variety of information output from the user interface 24 and the variety of information acquired from the external apparatus through the communication interface 25. That is, the CPU 31 and the storage 32 configure an example of the control unit. The details of the variety of programs will be described later.

The storage 32 has a program storage area 32A and a data storage area 32B. The program storage area 32A is configured to store therein an OS (abbreviation of Operating System) 34 and a control program 35. The control program 35 may be a single program or a combination of a plurality of programs. The data storage area 32B is configured to store therein data or information, which is required to execute the control program 35.

The 'data' and 'information' described in this disclosure have a common feature in that 'data' and 'information' are bits or a bit string, which can be handled by a computer. The term 'data' indicates that a semantic content represented by each bit can be handled by a computer without considering the semantic content. In contrast, the term 'information' indicates that an operation of the computer is branched by a semantic content represented by each bit. Further, the term 'instruction' indicates a control signal for urging an apparatus of a transmission destination to perform a next operation, and may include the information or may have a property as the information.

Also, the 'data' and 'information' are handled as the same data and information even though the formats (for example, a text format, a binary format, a flag format and the like) are changed for each computer, inasmuch as they are recognized as the same semantic content. For example, the information representing 'two' may be kept as information of a text format "0x32", which is the ASCII code, in one computer and may be kept as information of a binary format "10", which is the binary representation, in another computer.

Also, in this disclosure, the 'data' and 'information' before and after a predetermined calculation is applied thereto may be handled as the same data and information. For example, it is assumed that unencrypted key information is stored in the storage and encrypted key information (hereinafter, referred to as 'encryption key information') is received through the communication interface 25. In this case, when the key information stored in the storage coincides with decrypted key information obtained by decrypting the encryption key information, the key information, the encryption key information and the decrypted key information may be handled as the same 'key information'. In the meantime, the 'predetermined calculation' is not limited to the encryption/decryption and may be a calculation using a Hash function, for example.

However, the distinction of the 'data' and 'information' is not strict, and exceptional handling is also allowed. For example, the data may be temporarily handled as the information, and the information may be temporarily handled as the data. Also, one that is handled as the data in an apparatus may be handled as the information in another apparatus. Further, the information may be extracted from the data, and the data may be extracted from the information.

The storage 32 is configured by a random access memory (hereinafter, also referred to as RAM), a read only memory (hereinafter, also referred to as ROM), an electrically erasable programmable read-only memory (hereinafter, also referred to as EEPROM), a hard disk drive (hereinafter, also referred to as HDD), a buffer memory provided for the CPU 31 or a combination thereof.

The storage 32 may be a computer-readable storage medium. The computer-readable storage medium is a non-transitory medium. The non-transitory medium includes a recording medium such as a CD-ROM and a DVD-ROM, too. Also, the non-transitory medium is a tangible medium. In the meantime, an electric signal for carrying a program to be downloaded from a server and the like on the Internet is a computer-readable signal medium, which is one kind of the computer-readable medium, but is not included in the non-transitory computer-readable storage medium.

The program stored in the program storage area 32A is configured to be executed by the CPU 31. However, in this disclosure, the operations of each program may be described while omitting the CPU 31. That is, in below descriptions, the description 'program A is configured to execute processing A' may convey the meaning 'CPU 31 is configured to execute processing A described in the program A'. This is also the same for the portable device 50 and server apparatus 70, which will be described later.

The OS 34 is a basic program for providing an API (abbreviation of Application Programming Interface) configured to control the printer unit 11, the scanner unit 12, the display 23, the user interface 24, the communication interface 25 and the like, which are the hardware configuring the multi function device 10. That is, each program described above is configured to call the API provided by the OS 34, thereby controlling the respective hardware. However, in this disclosure, the operations of each program are described while omitting the OS 34. That is, in below descriptions, the description 'program B is configured to control hardware C' may convey the meaning 'program B is configured to control hardware C through the API of the OS 34'. This is also the same for the portable device 50 and server apparatus 70, which will be described later.

Figure 2B:
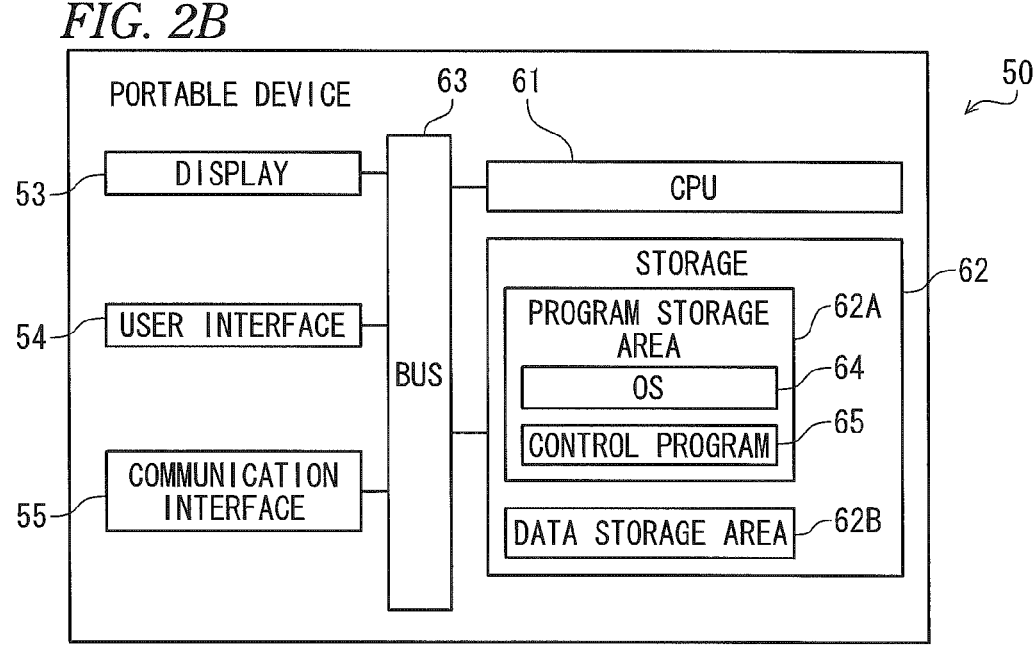

As shown in FIG. 2B, the portable device 50 mainly has a display 53, a user interface 54, a communication interface 55, a CPU 61, a storage 62 and a communication bus 63. Since the display 53, the user interface 54, the communication interface 55, the CPU 61, the storage 62 and the communication bus 63, which are included in the portable device 50, are common to the display 23, the user interface 24, the communication interface 25, the CPU 31, the storage 32 and the communication bus 33, which are included in the multi function device 10, the overlapping descriptions are omitted. The CPU 61 and the storage 62 configure an example of the control unit. The portable device 50 is an example of the information processing apparatus. However, the specific example of the information processing apparatus is not limited to the portable device 50 such as a smart phone, a portable phone and a tablet terminal, and may be a personal computer (hereinafter, also referred to as PC) and the like.

The communication interface 55 is configured to perform communication with the multi function devices 10A, 10B, 10C belonging to the LAN 102 and to perform communication with the server apparatus 70 connected to the Internet 101 via the router 102A. That is, the portable device 50 is configured to transmit a variety of data or information to the multi function device 10 or server apparatus 70 through the communication interface 55 and to receive the variety of data or information from the multi function device 10 or server apparatus 70 through the communication interface 55.

The data storage area 62B of the storage 62 can store therein a cooperation operation list. The cooperation operation list is a list for defining a cooperation operation of enabling a first apparatus to execute a first operation and a second apparatus to execute a second operation after the first operation. For example, as shown in FIG. 10, in the cooperation operation list, a first apparatus and a second apparatus selected from a plurality of apparatuses are associated with execution sequences of operations to be executed by the apparatuses, apparatus IDs for identifying the apparatuses, operation contents to be executed by the apparatuses, progressing statuses of operations to be executed by the apparatuses, and standby flags indicating whether operations of the apparatuses can start. The cooperation operation list is an example of the cooperation operation information. Also, the corresponding apparatus ID and operation content are examples of the operation information.

Meanwhile, in the cooperation operation list shown in FIGS. 10A-10E, a cooperation operation including a plurality of first operations and one second operation is defined. However, the numbers of the first operations and second operations included in the cooperation operation are not limited to the examples of FIGS. 10A-10E. That is, the first and second operations included in the cooperation operation may be one or more. In other words, the cooperation operation may include one or more first operations and one or more second operations.

In the cooperation operation list shown in FIGS. 10A-10E, the server apparatus 70 identified with an apparatus ID "server A", the multi function device 10A identified with an apparatus ID "MFC-A" and the multi function device 10B identified with an apparatus ID "MFC-B" are examples of the first apparatus configured to execute the first operation. Also, the multi function device 10C identified with an apparatus ID "MFC-C" is an example of the second apparatus configured to execute the second operation. The first operation is an operation including transmission of target data to the portable device 50. The second operation is an operation including reception of target data from the portable device 50.

For example, the operation content "DL" associated with the server apparatus 70 indicates a first operation of transmitting target data 1 stored in the server apparatus 70 to the portable device 50. The operation content "SCAN" associated with the multi function devices 10A, 10B indicates a second operation of enabling the scanner unit 12 to execute the scan processing and transmitting target data 2, 3 generated in the scan processing to the portable device 50. The operation content "PRINT" associated with the multi function device 10C indicates a second operation of receiving target data 1 to 3 from the portable device 50 and enabling the printer unit 11 to execute recording processing of the target data 1 to 3.

In the meantime, although not shown, the operation contents included in the cooperation operation list may include more detailed content (hereinafter, referred to as 'setting information'). For example, the operation content "DL" may be added with a data ID of the target data, which is a downloading target, and the like. Also, the operation content "SCAN" may be added with a document size indicating a size of a document, information indicating a color scan or monochrome scan, information indicating a duplex scan or one-sided scan, and the like. Further, the operation content "PRINT" may be added with information indicating a size of a recording sheet, information indicating a number of sheets to be printed, information indicating a number of images to be included on one recording sheet, information indicating a duplex print or one-sided print, and the like.

Regarding the progressing status, one of "operation standby" indicating that a corresponding operation has not started yet, "under operation" indicating that a corresponding operation is being executed, "operation completed" indicating that communication with the portable device 50 of a corresponding operation has been completed, "under suspension" indicating a position of a "C" icon is tapped during execution of a corresponding operation, and "cancel" indicating that a position of a "C" icon is tapped before a corresponding operation starts is set. The values that can be set as regards the progressing status will be described later.

Regarding the standby flag, "ON" is set when it is necessary to stand by for start of a corresponding operation, and "OFF" is set when it is possible to start a corresponding operation. "OFF" is set as the standby flag before the cooperation operation starts. The processing in which the standby flag is used will be described in a modified embodiment.

The cooperation operation list can be arbitrarily prepared and edited by the user of the portable device 50. The portable device 50 may receive new registration and editing of the cooperation operation list by the user through the display 53 and the user interface 54, for example. A specific operation method of the new registration and editing of the cooperation operation list is omitted. Also, a plurality of the cooperation operation lists can be stored in the data storage area 62B. For this reason, the cooperation operation list stored in the data storage area 62B is assigned a cooperation operation ID for identifying the cooperation operation list.

The server apparatus 70 is a storage server configured to store therein data, for example. Although the specific example of the server apparatus 70 is not particularly limited, the server apparatus 70 is an apparatus configured to provide services such as 'Dropbox (registered trademark of Dropbox, Inc.)', 'Google Drive (registered trademark of Google Inc.)', 'Evernote (registered trademark of Evernote Corporation)' and the like. Also, the present disclosure is not limited to the configuration where the server apparatus 70 is connected to the Internet 101, and the server apparatus 70 may be a local storage server belonging to the LAN 102.

Figure 7A:
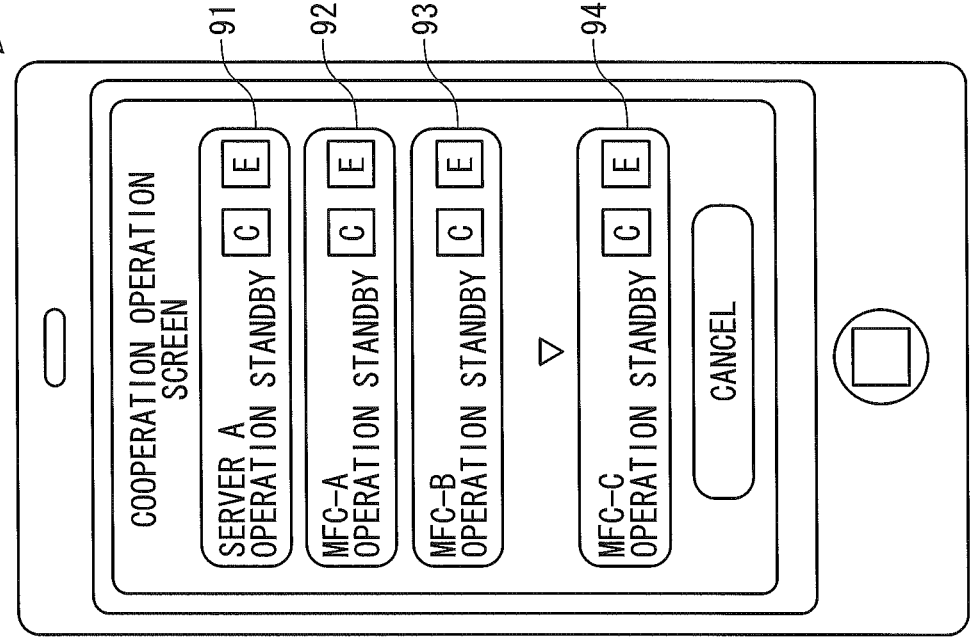
Figure 7B:
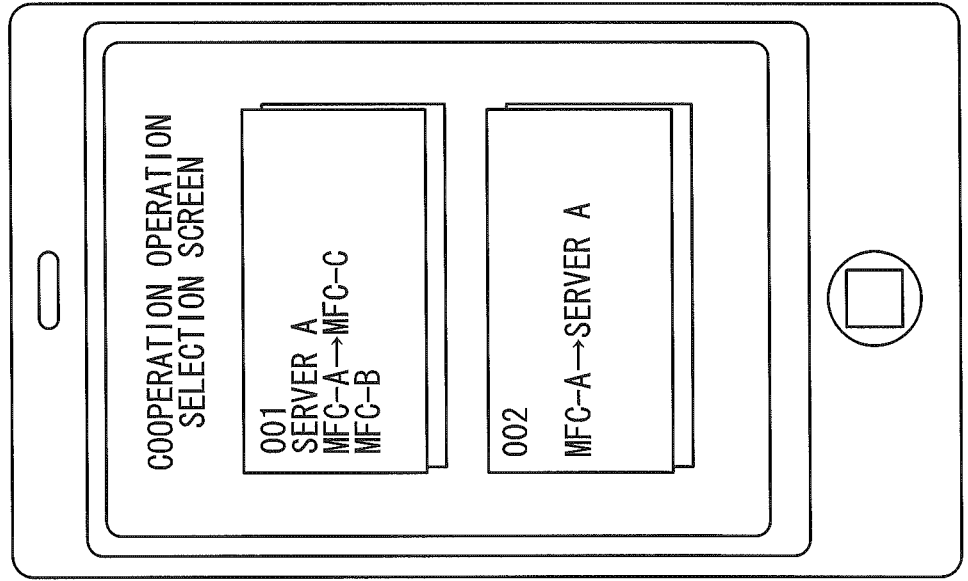

Operations of the cooperation system 100 are described with reference to FIGS. 3 to 10E. First, a basic flow of the cooperation operation that is controlled by the portable device 50 is described with reference to FIG. 3. The control program 65 of the portable device 50 displays a cooperation operation selection screen on the display 53 (S10). FIG. 7A illustrates an example of the cooperation operation selection screen. The cooperation operation selection screen shown in FIG. 7A includes one or more cooperation operation icons. The cooperation operation icon is denoted with a cooperation operation ID for identifying the cooperation operation list stored in the data storage area 62B.

Then, when the user interface 54 receives a user's operation of tapping a position of the cooperation operation icon (S11: Yes), the control program 65 reads out a cooperation operation list identified with the cooperation operation ID denoted at the cooperation operation icon from the data storage area 62B (S12). The processing of step S11 is an example of the reception processing of receiving a start instruction to start the cooperation operation. Also, the processing of step S11 is an example of the reception processing of receiving a selection instruction to select the cooperation operation identification information and the start instruction. Further, the processing of step S12 is an example of the acquisition processing.

Also, the control program 65 displays a cooperation operation screen on the display 53 (S13). FIGS. 7B to 9 illustrate examples of the cooperation operation screen. The cooperation operation screens shown in FIGS. 7B to 9B include status images 91, 92, 93, 94 corresponding to the first apparatuses and second apparatus included in the cooperation operation list acquired in step S12, a variety of icons added to the respective status images 91, 92, 93, 94, and a cancel icon for ending the cooperation operation indicated on the cooperation operation screen. The processing of step S13 is an example of the display control processing. The cooperation operation screen is an example of the status screen.

In the status images 91 to 94, the apparatus IDs included in the cooperation operation list and progressing statuses associated with the apparatus IDs are indicated. That is, the information indicated in the status images 91 to 94 is changed as the cooperation operation progresses. More specifically, the progressing statuses indicated in the status images 91 to 94 shown in FIGS. 7B to 9B correspond to the progressing statuses included in the cooperation operation list shown in FIGS. 10A-10E. Also, the status images 91 to 94 are arranged in accordance with execution sequences of the cooperation operation list.

In the cooperation operation screens shown in FIGS. 7B to 9B, the status image 91 represents a progressing status of the first operation that is executed by the server apparatus 70 identified with the apparatus ID "server A". The status image 92 represents a progressing status of the first operation that is executed by the multi function device 10A identified with the apparatus ID "MFC-A". The status image 93 represents a progressing status of the first operation that is executed by the multi function device 10B identified with the apparatus ID "MFC-B". The status image 94 represents a progressing status of the second operation that is executed by the multi function device 10C identified with the apparatus ID "MFC-C".

The icons that can be added to the status images 91 to 94 include a "C" icon, an "E" icon, a "Re" icon and a "D" icon, for example. The "C" icon is an example of the stop instruction object for receiving a stop instruction to stop an operation that is executed by a corresponding apparatus. The "E" icon is an example of the correction instruction object for receiving an instruction to correct an operation content of an operation that is executed by a corresponding apparatus. The "Re" icon is an example of the resumption instruction object for receiving a resumption instruction to resume a stopped operation. The "D" icon is an example of the deletion instruction object for receiving a deletion instruction to delete the target data that has been already received from a corresponding first apparatus. Also, the "C" icon and the "D" icon are examples of the change instruction object for receiving a change instruction to change an operation that is executed by a corresponding apparatus.

In the meantime, the icons added to the respective status images 91 to 94 are changed in accordance with the progressing statuses of the operations indicated in the status images 91 to 94. Specifically, as shown in FIG. 4, the status images of the first and second apparatuses of which the progressing statuses are "operation standby" are added with the "C" icon and the "E" icon. The status images of the first and second apparatuses of which the progressing statuses are "under operation" are added with the "C" icon. The status image of the first apparatus of which the progressing status is "operation completed" is added with the "D" icon. The status image of the second apparatus of which the progressing status is "operation completed" is not added with the icon. The status image of the first apparatus of which the progressing status is "under suspension" is added with the "Re" icon and the "D" icon. The status image of the second apparatus of which the progressing status is "under suspension" is added with the "Re" icon. The status images of the first and second apparatuses of which the progressing statuses are "cancel" are added with the "Re" icon and the "E" icon.

Then, the control program 65 enables each of the first apparatuses to execute the first operation in the execution sequence indicated in the cooperation operation list (S14 to S21). Specifically, the control program 65 initializes a parameter m (S14). When "OFF" is set for the standby flag of the m-th first apparatus of the cooperation operation list (S15: Yes), the control program 65 transmits operation instruction information to the first apparatus through the communication interface 55 (S16). The operation instruction information is information for enabling a destination apparatus to execute a corresponding operation. The processing of step S16 and step S25 is an example of the operation instruction processing. The details of the operation instruction processing will be described later.

Subsequently, the control program 65 changes the progressing status of the m-th first apparatus from "operation standby" to "under operation" (S17) and hides the "E" icon added to the status image of the first apparatus. That is, the control program 65 adds the "E" icon to the status image of the first apparatus after the position of the cooperation operation icon is tapped until the operation instruction information is transmitted to the first apparatus (S12: Yes to S16). In the meantime, when the operation instruction information is transmitted to the first apparatus (S16), the control program 65 hides the "E" icon added to the status image of the first apparatus.

Then, the control program 65 suspends execution of subsequent processing until transmission completion information is received from the m-th first apparatus through the communication interface 55 (S18: No). Also, the control program 65 sequentially receives the target data, which has been divided into multiple data, from the first apparatus through the communication interface 55 and stores the same in the data storage area 62B until the transmission completion information is received from the first apparatus (S18: No).

The transmission completion information is information indicating that transmission of the target data to the portable device 50 of the first operation to be executed by the first apparatus is completed. That is, when the transmission completion information is received from the first apparatus through the communication interface 55, the control program 65 determines that the reception of the target data from the first apparatus is completed. Although the specific example of the transmission completion information is not particularly limited, it may be a packet in which "ON" is set for a FIN flag of a Transmission Control Protocol (hereinafter, also referred to as TCP) header.

Subsequently, when the transmission completion information is received from the m-th first apparatus through the communication interface 55 (S18: Yes), the control program 65 changes the progressing status of the first apparatus from "under operation" to "operation completed" (S19), hides the "C" icon added to the status image of the first apparatus and newly adds the "D" icon to the status image.

That is, the control program 65 adds the "C" icon to the status image of the first apparatus after the position of the cooperation operation icon is tapped until the transmission completion information is received from the first apparatus (S11: Yes to S18: No). On the other hand, when the transmission completion information is received from the first apparatus (S18: Yes), the control program 65 hides the "C" icon added to the status image of the first apparatus. Also, when the transmission completion information is received from the first apparatus (S18: Yes), the control program 65 adds the "D" icon to the status image of the first apparatus.

Then, when the first operation not executed yet is included in the cooperation operation list (S20: Yes), the control program 65 increments the parameter m by 1 (one) (S21) and again executes the processing of steps S15 to S19. That is, in step S16 that is repeatedly executed, the control program 65 transmits the operation instruction information to each of the first apparatuses in the execution sequence indicated in the cooperation operation list.

When all the first operations registered in the cooperation operation list are executed (S20: Yes), the control program 65 hides all the icons added to the status image of the first apparatus (S22). That is, the control program 65 adds the "Re" icon and the "D" icon to the status image 92 until the reception of the target data from all the other first apparatuses is completed (S20: No). On the other hand, when the reception of the target data from all the other first apparatuses is completed (S20: Yes), the control program 65 hides the "Re" icon and the "D" icon added to the status image 92.

Subsequently, when all the first apparatuses registered in the cooperation operation list are enabled to execute the first operation, the control program 65 enables each of the second apparatuses to execute the second operation in the execution sequence indicated in the cooperation operation list (S23 to S30). Since the processing of step S23 to S30 is common to the processing of steps S14 to S21, the detailed descriptions thereof are omitted and the differences are described.

First, when the operation instruction information is transmitted to the second apparatus through the communication interface 55 (S25), the control program 65 changes the progressing status of the second apparatus from "operation standby" to "under operation" (S26) and hides the "E" icon added to the status image of the second apparatus. That is, the control program 65 adds the "E" icon to the status image of the second apparatus after the position of the cooperation operation icon is tapped until the operation instruction information is transmitted to the second apparatus (S11: Yes to S25). On the other hand, when the operation instruction information is transmitted to the second apparatus (S25), the control program 65 hides the "E" icon added to the status image of the second apparatus.

Also, the control program 65 sequentially transmits the target data, which has been divided into multiple data, to the second apparatus through the communication interface 55 until reception completion information is received from the n-th second apparatus through the communication interface 55 in step S27. The reception completion information is information indicating that the reception of the target data from the portable device 50 of the second operation is completed. That is, when the reception completion information is received from the second apparatus through the communication interface 55, the control program 65 determines that the transmission of the target data to the second apparatus is completed. Although the specific example of the reception completion information is not particularly limited, it may be a packet in which "ON" is set for a FIN flag and an ACK flag of a TCP header.

Further, when the progressing status of the n-th second apparatus is changed from "under operation" to "operation completed" in step S28, the control program 65 hides the "C" icon added to the status image of the second apparatus. That is, the control program 65 adds the "C" icon to the status image of the second apparatus after the position of the cooperation operation icon is tapped until the reception completion information is received from the second apparatus (S11: Yes to S27: No). On the other hand, when the reception completion information is received from the second apparatus (S27: Yes), the control program 65 hides the "C" icon added to the status image of the second apparatus. Then, when all the second operations registered in the cooperation operation list have been executed (S29: No), the control program 65 ends the cooperation operation control processing.

Figure 3:
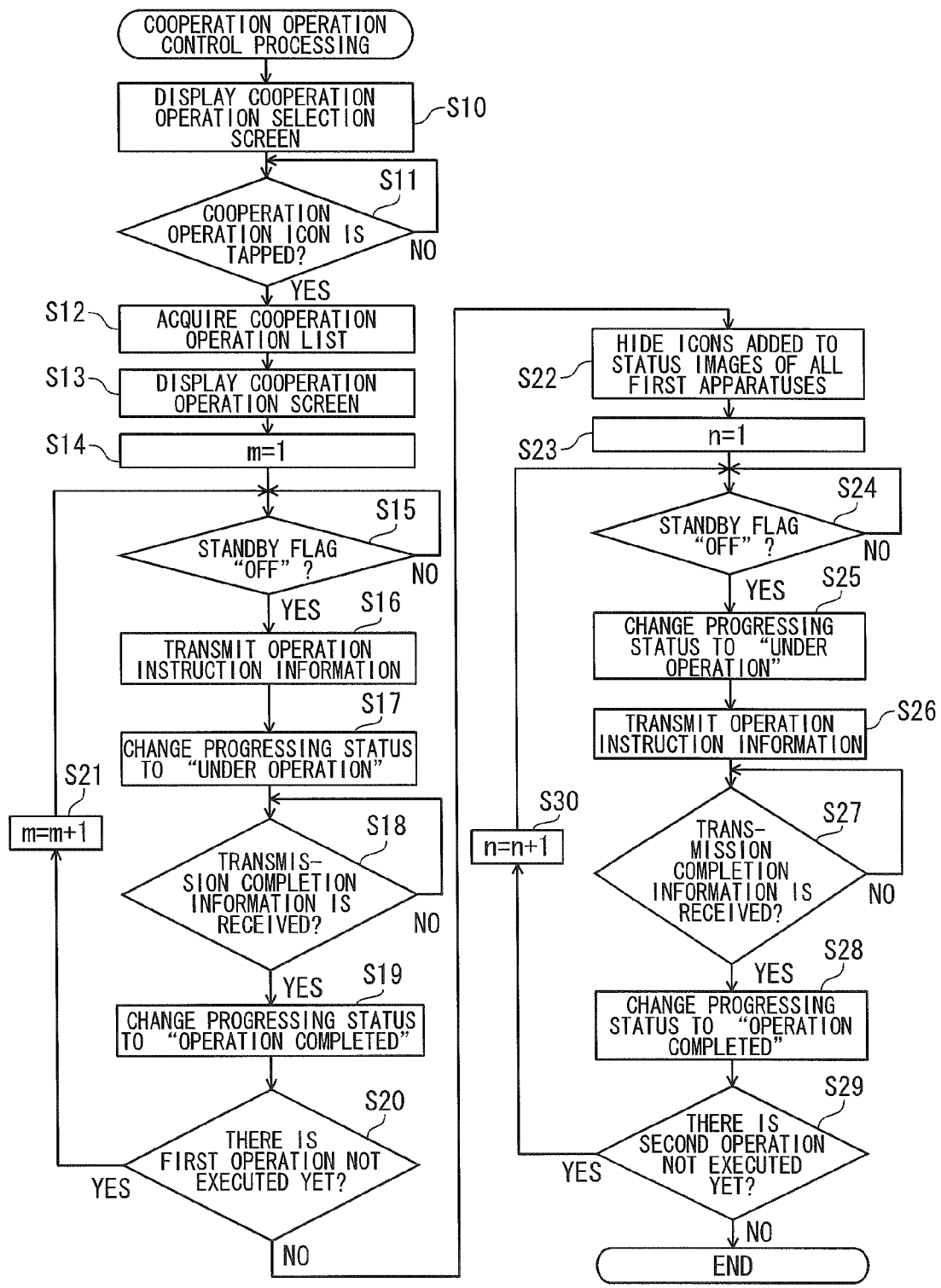
FIG. 3 is a flowchart of cooperation operation control processing that is executed by a control program 65 of the portable device 50.
Figure 5:
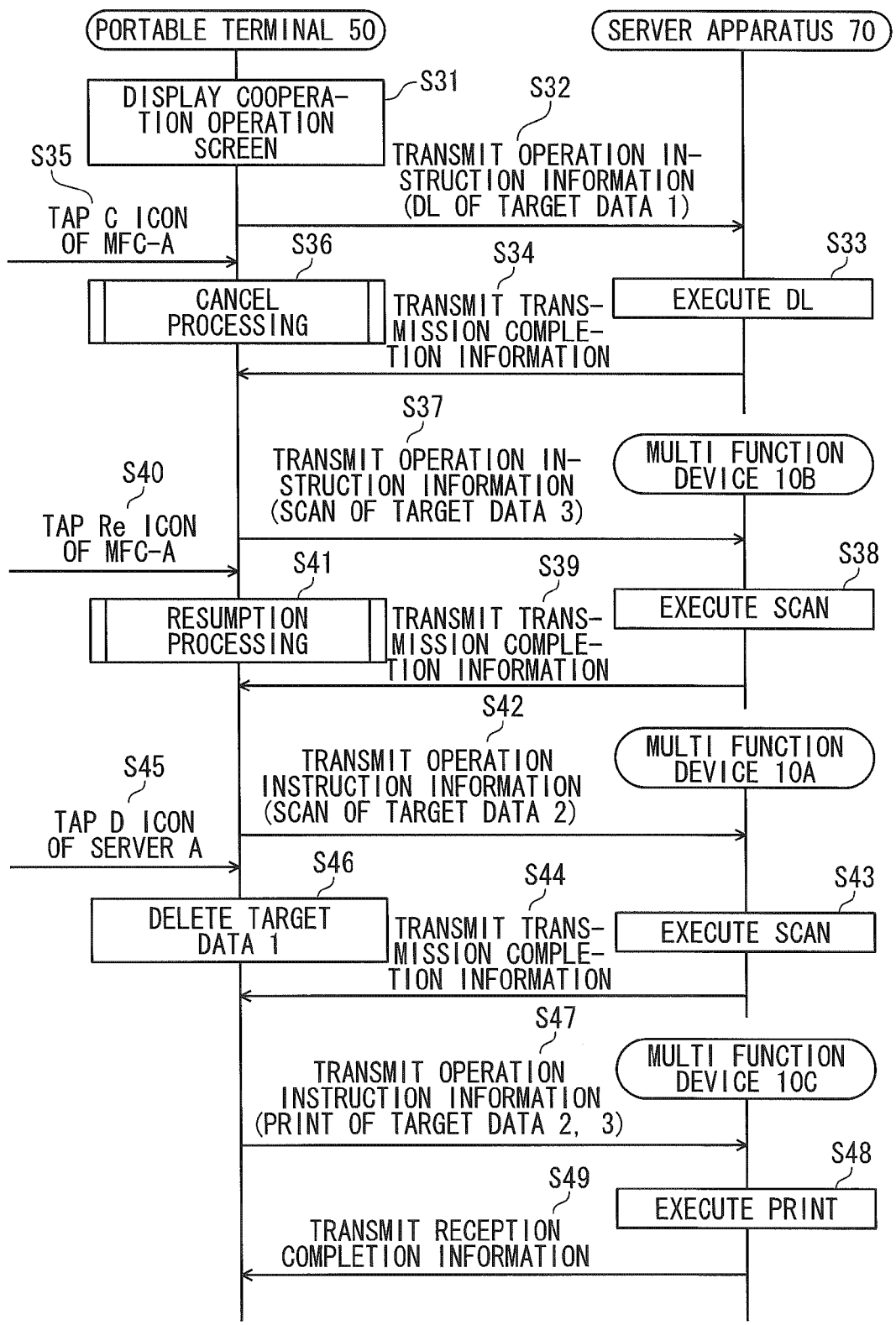
FIG. 5 shows an example of a sequence diagram relating to processing that is executed when a variety of icons are tapped at predetermined timing during a cooperation operation.

In the illustrative embodiment, the user's operation of tapping the positions of the various icons added to the status images can be received on the user interface 54 while the cooperation operation described with reference to FIG. 3 is being executed. The processing, which is executed when the position of each icon is tapped at timing shown in FIG. 5, is described in detail with reference to FIGS. 5 to 10E.

First, when the user interface 54 receives a user's operation of tapping a position of the cooperation operation icon, the control program 65 changes all the progressing statuses of the cooperation operation list identified with the cooperation operation ID denoted at the tapped cooperation operation icon to "operation standby", as shown in FIG. 10A. Also, the control program 65 displays the cooperation operation screen shown in FIG. 7B on the display 53, in accordance with the cooperation operation list shown in FIG. 10A (S31). In the cooperation operation screen shown in FIG. 7B, the progressing statuses of all the status images 91 to 94 are "operation standby" and all the status images 91 to 94 are added with the "C" icon and the "E" icon.

Figure 8B:
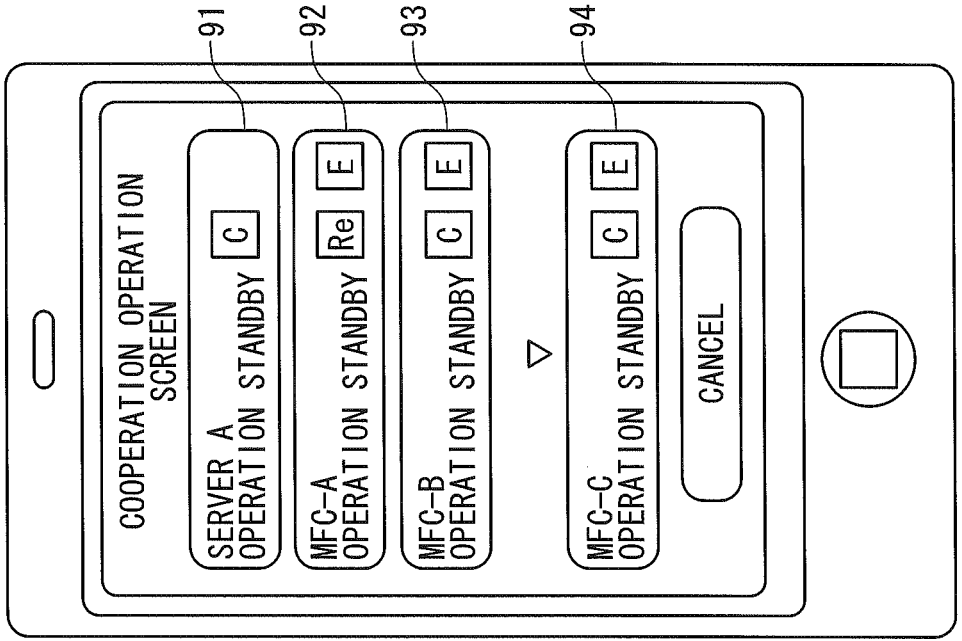
FIG. 8B illustrates a cooperation operation screen at the time that an operation of an apparatus MFC-A is cancelled.
Figure 8A:
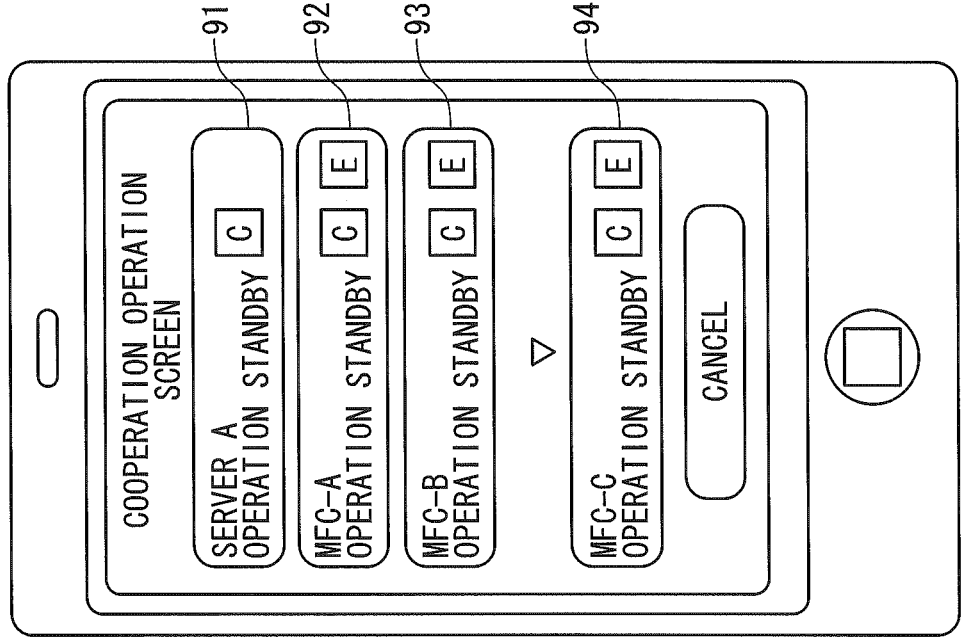

Subsequently, the control program 65 transmits the operation instruction information to the server apparatus 70 of which execution sequence is first, through the communication interface 55 (S32). This operation instruction information is an instruction to transmit target data 1 stored in the server apparatus 70 to the portable device 50. Also, as shown in FIG. 10B, the control program 65 changes the progressing status of the apparatus ID "server A" from "operation standby" to "under operation." Further, as shown in FIG. 8A, the control program 65 changes the progressing status of the status image 91 from "operation standby" to "under operation", and hides the "E" icon added to the status image 91.

Meanwhile, the server apparatus 70 having received the operation instruction information from the portable device 50 executes the first operation of transmitting the target data 1 to the portable device 50 (S33). The control program 65 of the portable device 50 stores the target data 1, which has been received from the server apparatus 70 through the communication interface 55, in the data storage area 62B. Then, when the transmission of the target data 1 to the portable device 50 is completed, the server apparatus 70 transmits the transmission completion information to the portable device 50 (S34).

When the user interface 54 receives the user's operation of tapping the position of the "C" icon added to the status image 91 (S35) before the transmission completion information is received from the server apparatus 70 through the communication interface 55, for example, the control program 65 of the portable device 50 executes cancel processing (S36). The cancel processing of the illustrative embodiment is an example of the change processing of excluding operation information of a corresponding apparatus from the cooperation operation list. The cancel processing is described in detail with reference to FIG. 6A.

First, the control program 65 determines whether the operation instruction information has been already transmitted to the apparatus corresponding to the tapped "C" icon (S51). In this illustrative embodiment, when the user interface 54 receives the user's operation of tapping the position of the "C" icon corresponding to the multi function device 10A (S51: No) before the operation instruction information is transmitted, the control program 65 excludes the operation information of the multi function device 10A from the cooperation operation list (S54). Specifically, as shown in FIG. 10C, the control program 65 makes the execution sequence corresponding to the apparatus ID "MFC-A" blank and moves up the execution sequences of the subsequent operations.

Also, as shown in FIG. 10C, the control program 65 changes the progressing status corresponding to the apparatus ID "MFC-A" from "operation standby" to "cancel" (S55). Accompanied by this, the control program 65 changes the progressing status of the status image 92 from "operation standby" to "cancel", and adds the "Re" icon, instead of the "C" icon, to the status image 92, as shown in FIG. 8B. That is, in this illustrative embodiment, when the position of the "C" icon corresponding to an apparatus before the operation instruction information is transmitted is tapped, the "Re" icon is added to the corresponding status image. In the meantime, processing which is executed when the position of the "C" icon corresponding to an apparatus having already transmitted the operation instruction information is tapped (Yes in S51: S52 & S53)), will be described in a modified embodiment.

When the transmission completion information is received from the server apparatus 70 through the communication interface 55 (S34), the control program 65 transmits the operation instruction information to the multi function device 10B of which the execution sequence is second, through the communication interface 55 (S37). This operation instruction information is an instruction to enable the scanner unit 12 to execute the scan processing and to transmit the target data 3 generated in the scan processing to the portable device 50.

Figure 9A:
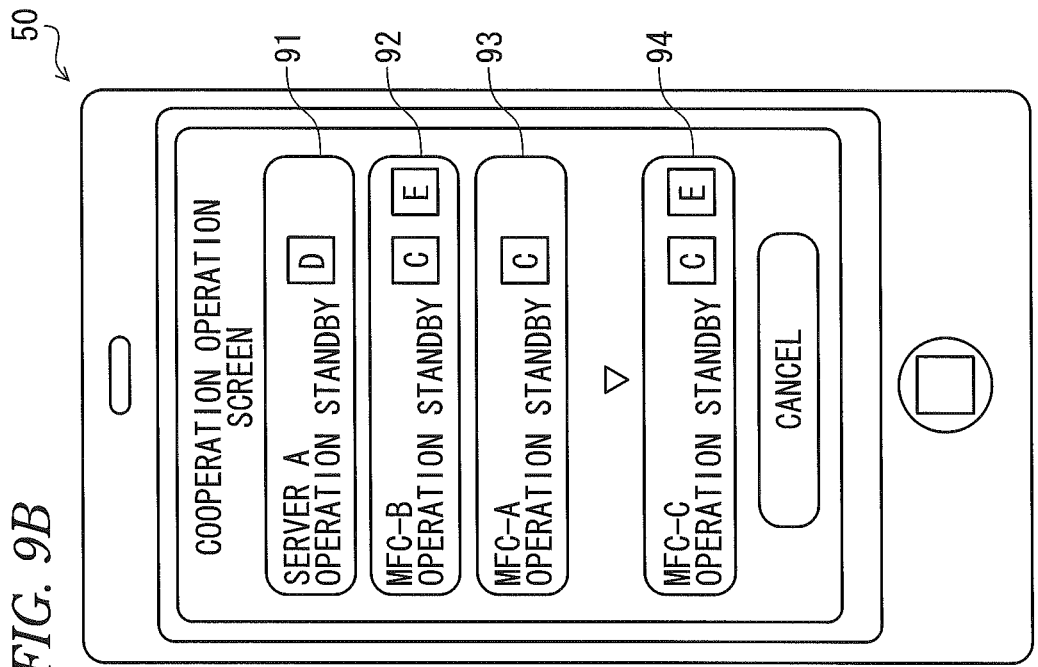

Also, as shown in FIG. 10D, the control program 65 changes the progressing status corresponding to the apparatus ID "server A" from "under operation" to "operation completed", and changes the progressing status corresponding to the apparatus ID "MFC-B" from "operation standby" to "under operation." Accompanied by this, as shown in FIG. 9A, the control program 65 changes the progressing status of the status image 91 from "under operation" to "operation completed" and adds the "D" icon rather than "C" icon to the status image 91. Also, as shown in FIG. 9A, the control program 65 changes the progressing status of the status image 93 from "operation standby" to "under operation" and hides the "E" icon of the status image 93.

The control program 35 of the multi function device 10B having received the operation instruction information from the portable device 50 through the communication interface 25 executes the first operation of transmitting the target data 3 generated in the scan processing to the portable device 50 (S38). The control program 65 of the portable device 50 stores the target data 3 received from the multi function device 10B through the communication interface 55 in the data storage area 62B. When the transmission of the target data 3 to the portable device 50 is completed, the control program 35 of the multi function device 10B transmits the transmission completion information to the portable device 50 (S39).

When the user interface 54 receives a user's operation of tapping a position of the "Re" icon added to the status image 92 (S40) before the transmission completion information is received from the multi function device 10B through the communication interface 55, for example, the control program 65 of the portable device 50 executes resumption processing (S41). In this illustrative embodiment, the resumption processing is an example of the registration processing of re-adding the operation information of a corresponding apparatus to the cooperation operation list. The resumption processing is described in detail with reference to FIG. 6B.

First, the control program 65 determines whether the operation instruction information has been already transmitted to the apparatus corresponding to the tapped "Re" icon (S56). In this illustrative embodiment, since the operation instruction information has not been transmitted yet to the multi function device 10A (S56: No), the control program 65 re-adds the operation information of the multi function device 10A to the cooperation operation list (S59). Specifically, as shown in FIG. 10E, the control program 65 sets the execution sequence corresponding to the apparatus ID "MFC-A" to a third and sets the execution sequence corresponding to the apparatus ID "MFC-C" to a fourth.

Figure 9B:
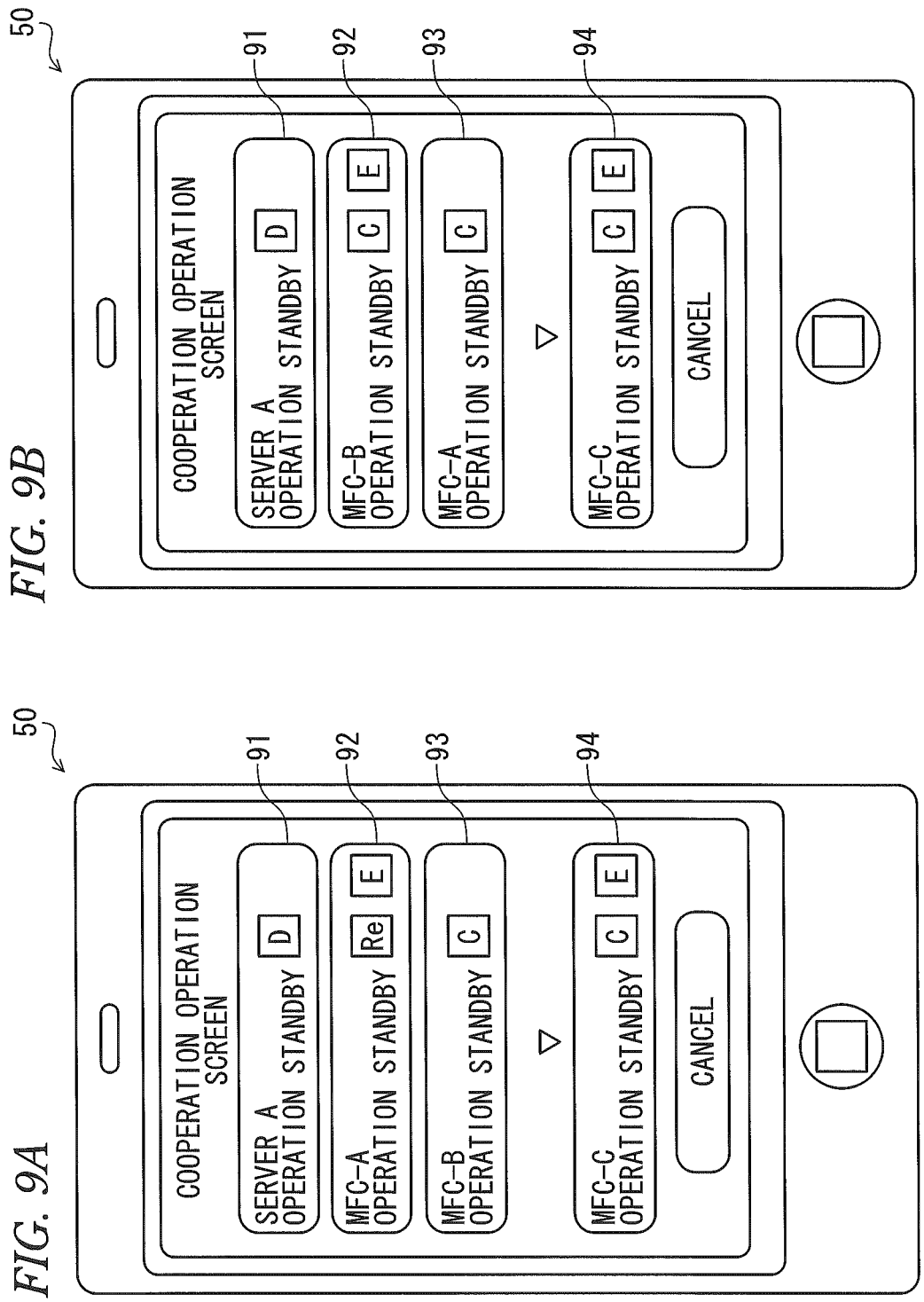

Also, the control program 65 changes the progressing status corresponding to the apparatus ID "MFC-A" from "cancel" to "operation standby" (S60). Accompanied by this, the control program 65 changes the progressing status of the status image 92 from "cancel" to "operation standby" and adds the "C" icon rather than the "Re" icon to the status image 92, as shown in FIG. 9B. In the meantime, processing which is executed when the position of the "Re" icon corresponding to the apparatus having already transmitted the operation instruction information is tapped (Yes in S56: S57 & S58), will be described in a modified embodiment.

The execution sequence of the first operation of reregistering the operation information in the cooperation operation list in step S59 is not particularly limited inasmuch as it is executed before the second operation. That is, the corresponding operation may be executed after the first operation being currently executed or after the final first operation. This is also the same for the execution sequence of the second operation of reregistering the operating information in the cooperation operation list in step S59.

Subsequently, when the transmission completion information is received from the multi function device 10B through the communication interface 55 (S39), the control program 65 transmits the operation instruction information to the multi function device 10A of which the execution sequence is third, through the communication interface 55 (S42). This operation instruction information is an instruction to enable the scanner unit 12 to execute the scan processing and to transmit the target data 2 generated in the scan processing to the portable device 50. In the meantime, since the processing of updating the cooperation operation list and cooperation operation screen, which is executed as the operation instruction information is transmitted to the multi function device 10A, is common to the above example, the overlapping description is here omitted.

The control program 35 of the multi function device 10A having received the operation instruction information from the portable device 50 through the communication interface 25 executes the first operation of transmitting the target data 2 generated in the scan processing to the portable device 50 (S43). The control program 65 of the portable device 50 stores the target data 2 received from the multi function device 10A through the communication interface 55 in the data storage area 62B. Then, when the transmission of the target data 2 to the portable device 50 is completed, the control program 35 of the multi function device 10B transmits the transmission completion information to the portable device 50 (S44).

When the user interface 54 receives a user's operation of tapping the position of the "D" icon added to the status image 91 (S45) before the transmission completion information is received from the multi function device 10A through the communication interface 55, for example, the control program 65 of the portable device 50 deletes the target data 1 stored in the data storage area 62B (S46). The processing of step S46 is an example of the deletion processing. That is, the target data 1 is not transmitted to the multi function device 10C in step S47, which will be described later.

Subsequently, when the transmission completion information is received from the multi function device 10A through the communication interface 55 (S44), the control program 65 hides all the icons added to the status images 91 to 93. Also, the control program 65 transmits the operation instruction information to the multi function device 10D of which the execution sequence is fourth, through the communication interface 55 (S47). This operation instruction information is an instruction to enable the printer unit 11 to receive the target data 2, 3 from the portable device 50 and to execute the recording processing of the target data 2, 3. Further, the control program 65 transmits the target data 2, 3 to the multi function device 10C through the communication interface 55. Since the processing of updating the cooperation operation list and cooperation operation screen, which is executed as the operation instruction information is transmitted to the multi function device 10C, is common to the above example, the overlapping description is here omitted.

The control program 35 of the multi function device 10C having received the operation instruction information from the portable device 50 through the communication interface 25 executes the second operation of receiving the target data 2, 3 from the portable device 50 and enabling the printer unit 11 to record images represented by the target data 2, 3 on a recording sheet (S48). Also, when the reception of the target data 2, 3 from the portable device 50 through the communication interface 25 is completed, the control program 35 transmits the reception completion information to the portable device 50 through the communication interface 25 (S49). In the meantime, the reception completion information may also be transmitted before the recording processing by the printer unit 11 is completed.

According to the above illustrative embodiment, when the operation instruction information is transmitted, the "E" icon is set to be unselectable, and when the transmission completion information or reception completion information is received, the "C" icon is set to be unselectable. That is, since the states of the corresponding "E" icon and "C" icon are changed in correspondence to the progressing statuses of the operations of the respective apparatuses, it is possible to enable the user to easily recognize whether it is possible to change the operation of each apparatus. That is, it is possible to implement a user interface for easily changing the operation of each apparatus individually. In the above illustrative embodiment, the processing that is executed when the positions of the various icons corresponding to the first apparatus are tapped has been described. However, the description also applies to a case where the positions of the various icons corresponding to the second apparatus are tapped. The processing of modified embodiment, which will be described later, is also the same.

In particular, according to the above illustrative embodiment, when the cooperation operation is executed based on the cooperation operation list including an unnecessary operation, it is possible to selectively exclude only the unnecessary operation by the "C" icon during the execution of the cooperation operation. Also, it is possible to delete the target data, which is acquired by the unnecessary first operation, by the "D" icon. Further, it is possible to re-add a falsely excluded operation to the cooperation operation by the "Re" icon. As a result, it is possible to optimize the cooperation operation without re-executing the cooperation operation from the beginning.

In the above illustrative embodiment, when the variety of icons are displayed on the cooperation operation screen, they can be selected at all times, and when the icons are hidden, they cannot be selected. However, the method of disabling the various icons from being selected is not limited thereto. That is, the variety of icons may be displayed in an unselectable aspect as such by displaying the icon on the cooperation operation screen in a grayed-out mode. In the meantime, the description 'a state where an icon can be selected' conveys the meaning that the processing associated with the icon is executed by the tapping operation and the like, for example. In the meantime, the description 'a state where an icon is set to be unselectable' conveys the meaning that the processing associated with the icon is not executed by the tapping operation and the like, for example.

Also, the function, which is implemented by tapping the position of the "C" icon, is not limited to the example of the above illustrative embodiment. For example, when the user interface 54 receives a user's operation of tapping the position of the "C" icon corresponding to all the first apparatuses, the control program 65 may stop the operation instruction processing (S25) for the second apparatus. As another example, in the change processing that is executed when the user interface 54 receives a user's operation of tapping the position of the "C" icon corresponding to all the second apparatuses, the control program 65 may transmit stop instruction information, which will be described later, to all the first apparatuses being executing the first operation, through the communication interface 55.

That is, when one of all the first operations and all the second operations are cancelled, it is not necessary to execute the other operations. That is, when the position of the "C" icon corresponding to all the first operations or all the second operations is tapped, the cooperation operation is preferably ended. In the meantime, when only one first or second apparatus is included in the cooperation operation list, the control program 65 may set the "C" icon corresponding to the apparatus that is unselectable. In this case, the user who wants to end the cooperation operation has only to tap the position of the cancel icon.

Meanwhile, in the above illustrative embodiment, a next operation is enabled to start after one operation is completed. However, the start timing of each operation is not limited thereto. For example, the control program 65 of the portable device 50 may transmit the operation instruction information to all the first apparatuses through the communication interface 55 without waiting for the reception of the transmission completion information. Then, when the transmission completion information is received from all the first apparatuses through the communication interface 55, the control program 65 may transmit the operation instruction information to all the second apparatuses through the communication interface 55 without waiting for the reception of the reception completion information. Thereby, since the plurality of first operations or the plurality of second operations is executed in parallel, the throughput of the cooperation operation is improved.

Also, in the above illustrative embodiment, one of the cooperation operation lists registered in advance is selected on the cooperation operation selection screen, so that the cooperation operation is enabled to start. Thereby, the operation registered in advance in the cooperation operation list can be deleted or changed after the cooperation operation starts. At this time, the input method of the start instruction and the acquisition method of the cooperation operation list are not limited to the above examples.

As an example, when the user interface 54 receives a user's operation of tapping a position of a start instruction icon (not shown) of the cooperation operation after the user interface 54 receives the user's operation of tapping the position of the cooperation operation icon in step S11, the control program 65 may start the cooperation operation. In this case, the processing of receiving the tapping operation two times and starting the cooperation operation is another example of the reception processing of receiving the selection instruction and the start instruction.

As another example, the selection of the first apparatus and the second apparatus, the selection of the operation to be executed by each apparatus, the designation of the execution sequence of each operation and the input of the start instruction may be performed on one screen. That is, the description 'the cooperation operation list is acquired' in step S12 conveys the meaning of reading out the cooperation operation list registered in advance from the data storage area 62B or acquiring the cooperation operation list from the user through the user interface 54.

Figure 11:
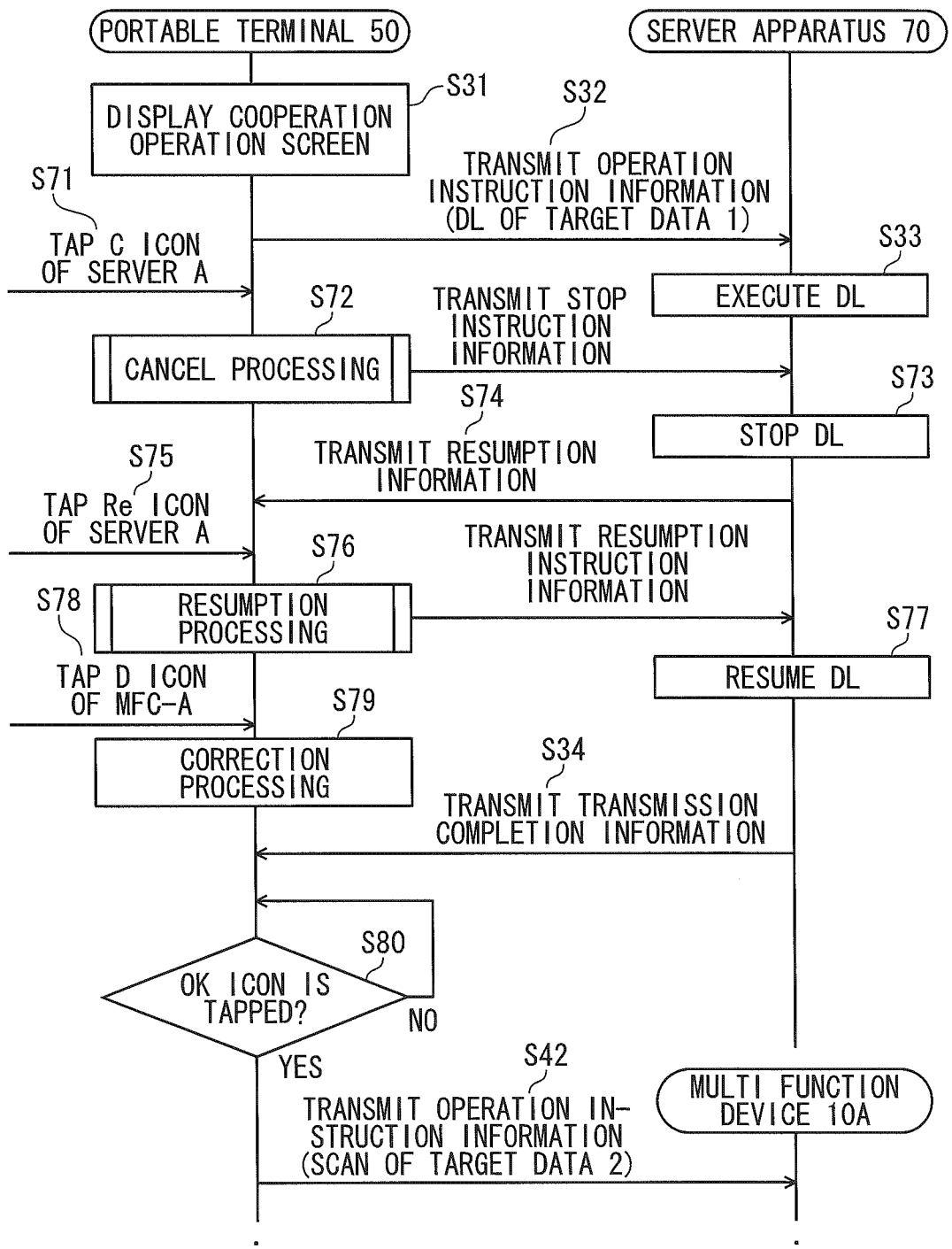
FIG. 11 shows another example of the sequence diagram relating to the processing that is executed when the various icons are tapped at predetermined timing during the cooperation operation.

A modified embodiment of the operation of the cooperation system 100 is described with reference to FIGS. 11 to 13. In the meantime, the common elements of the above illustrative embodiment are denoted with the same reference numerals, the descriptions thereof are omitted, and the differences are mainly described.

For example, when the user interface 54 receives a user's operation of tapping the position of the "C" icon of the apparatus ID "server A" (S71) on the cooperation operation screen shown in FIG. 8A before the transmission completion information is received from the server apparatus 70 through the communication interface 55, the control program 65 of the portable device 50 executes the cancel processing (S72). The cancel processing of the modified embodiment is an example of the change processing of stopping an operation being executed in a corresponding apparatus. The cancel processing is described in detail with reference to FIG. 6A.

When the user interface 54 receives a user's operation of tapping the position of the "C" icon corresponding to the server apparatus 70 having already transmitted the operation instruction information (S51: Yes), the control program 65 transmits stop instruction information to the server apparatus 70 through the communication interface 55 (S52). The stop instruction information is information for enabling an apparatus of a transmission destination to stop an operation being executed.

Also, as shown in FIG. 13A, the control program 65 changes the progressing status corresponding to the apparatus ID "server A" from "under operation" to "under suspension" (S53). Accompanied by this, the control program 65 changes the progressing status of the status image 91 from "under operation" to "under suspension", and adds the "Re" icon and "D" icon rather than the "C" icon to the status image 91, as shown in FIG. 12A. That is, in the modified embodiment, when the position of the "C" icon corresponding to the apparatus having transmitted the operation instruction information is tapped, the "Re" icon and the "D" icon are added to the corresponding status image.

The server apparatus 70 having received the stop instruction information from the portable device 50 stops the first operation being executed (S73) and transmits resumption information to the portable device 50 (S74). The resumption information is information for specifying a resumption position of the first operation. For example, the resumption information may be information for specifying a position of target data of which transmission is completed or information for specifying a position of target data that is to be transmitted next time.

Subsequently, the control program 65 of the portable device 50 stores the resumption information received from the server apparatus 70 through the communication interface 55 in the data storage area 62B and stands by until the user interface 54 receives a user's input operation. In the meantime, when predetermined standby time elapses after the position of the "C" icon is tapped or when predetermined standby time elapses after the resumption information is received, the control program 65 may start an operation that should be executed subsequently to the operation under suspension. Also, when the user interface 54 receives a user's operation of tapping the position of the "D" icon, the control program 65 may delete the target data, which has been received by the first operation under suspension, from the data storage area 62B and start an operation that should be executed subsequently to the first operation.

Then, when the user interface 54 receives a user's operation of tapping the position of the "Re" icon, which corresponds to the server apparatus 70 in which the first operation is under suspension, within a standby time period (S75), the control program 65 executes the resumption processing (S76). The resumption processing of the modified embodiment is an example of the resumption instruction processing of resuming an operation under suspension in a corresponding apparatus. The resumption processing is described in detail with reference to FIG. 6B.

When the user interface 54 receives a user's operation of tapping the position of the "Re" icon corresponding to the server apparatus 70 having already transmitted the operation instruction information (S56: Yes), the control program 65 transmits the resumption instruction information to the server apparatus 70 through the communication interface 55 (S57). The resumption instruction information is information for enabling an apparatus of a transmission destination to resume an operation under suspension. The resumption instruction information includes the resumption information stored in the data storage area 62B, for example. The server apparatus 70 having received the resumption instruction information from the portable device 50 resumes the first operation from the resumption position specified by the resumption information (S77).

Also, the control program 65 of the portable device 50 changes the progressing status corresponding to the apparatus ID "server A" from "under suspension" to "under operation", as shown in FIG. 13B (S58). Accompanied by this, the control program 65 changes the progressing status of the status image 91 from "under suspension" to "under operation" and adds the "C" icon rather than the "Re" icon and "D" icon to the status image 91, as shown in FIG. 8A.

Subsequently, when the user interface 54 receives a user's operation of tapping the position of the "E" icon added to the status image 92 (S78) before the transmission completion information is received from the server apparatus 70 through the communication interface 55, the control program 65 executes correction processing (S79). The correction processing is processing of correcting an operation content of an operation to be executed by a corresponding apparatus. The correction processing is described in detail with reference to FIG. 6C.

First, as shown in FIG. 13C, the control program 65 sets "ON" for the standby flag of the apparatus ID "MFC-A" corresponding to the tapped "E" icon (S61). Then, the control program 65 displays a correction reception screen rather than the cooperation operation screen on the display 53 (S62). FIG. 12B illustrates an example of the correction reception screen. The correction reception screen shown in FIG. 12B includes the setting information registered in the cooperation operation list, an ">" icon for receiving correction of each setting information, and an "OK" icon. When the user interface 54 receives a user's operation of tapping a position of the ">" icon on the correction reception screen, the control program 65 receives an input of corrected setting information. Although the specific input method of the setting information is not particularly limited, the setting information may be selected from a pull-down menu, for example.

Subsequently, when the user interface 54 receives a user's operation of tapping a position of the "OK" icon (S63: Yes), the control program 65 changes an operation content of the apparatus ID "MFC-A" of the cooperation operation list to the corrected operation content received through the correction reception screen (S64). Also, the control program 65 displays the cooperation operation screen rather than the correction reception screen on the display 53. Further, as shown in FIG. 13D, the control program 65 sets "OFF" for the standby flag corresponding to the apparatus ID "MFC-A" (S65).

In the meantime, when the transmission completion information is received from the server apparatus 70 through the communication interface 55 (S34: No) at timing at which the correction reception screen is displayed on the display 53, i.e., before the position of the "OK" icon on the correction reception screen is tapped, the control program 65 stands by for the transmission of the operation instruction information to the multi function device 10A. Then, when the user interface 54 receives a user's operation of tapping the position of the "OK" icon on the correction reception screen (S80: Yes), i.e., when the display of the correction reception screen is over, in other words, when "OFF" is set for the standby flag (S15: Yes), the control program 65 transmits the operation instruction information to the multi function device 10A through the communication interface 55 (S42).

According to the modified embodiment, since it is possible to individually correct the falsely set operation content, it is not necessary to again execute the cooperation operation from the beginning. Also, while "ON" is set for the standby flag, i.e., while the operation content is being corrected, the operation instruction information is not transmitted to the apparatus. Therefore, it is possible to prevent the operation from starting based on the falsely set operation content. In the modified embodiment, the cooperation operation is under suspension while "ON" is set for the standby flag. However, the control of the cooperation operation is not limited thereto. For example, the operation in which "ON" is set for the standby flag may be skipped over and a subsequent operation may be first executed.

Also, according to the above modified embodiment, it is possible to enable an apparatus under operation to temporarily stop the operation by tapping the position of the "C" icon and to resume the operation by tapping the position of the "Re" icon. Also, since the stopped operation is resumed from the middle of the operation based on the resumption information, the decrease in the throughput of the cooperation operation is suppressed. The resumption control on the operation by the resumption information is particularly effective for the second apparatus configured to execute the second operation of recording images on a plurality of recording media, for example. For example, when the operation is stopped at timing at which images are recorded on two sheets of 10 recording sheets, an image may be recorded on a third recording sheet and thereafter upon the resumption.

In the above illustrative embodiment, the variety of programs stored in the program storage area 32A, 62A of the storage 32, 62 of the multi function device 10 or portable device 50 are executed by the CPU 31, 61, so that the respective processing to be executed by the control unit of the present disclosure is implemented. However, the configuration of the control unit is not limited thereto, and a part or all of the configurations may be implemented by hardware such as IC (abbreviation of Integrated Circuit).

Further, the present disclosure can be implemented not only by the multi function device 10 or portable device 50 but also by a program configured to enable the multi function device 10 or portable device 50 to execute the processing. The program may be provided with being recorded in a non-transitory recording medium. The non-transitory recording medium may include a storage mounted to a server that can be connected to the multi function device 10 or portable device 50 through the communication network, in addition to a CD-ROM, a DVD-ROM and the like. The program stored in the storage of the server apparatus may be delivered through the communication network such as the Internet, as information or signal representing the program.

What is claimed is:

1. A non-transitory computer-readable recording medium storing computer-readable instructions for an information processing apparatus comprising, a processor, a touchscreen device including a display, and a user interface that receives an operation by a user, and a communication interface that wirelessly communicates with a plurality of apparatuses including a first apparatus and a second apparatus, the information processing apparatus being configured as a portable device,
 wherein the information processing apparatus performs a cooperation operation to instruct the first apparatus to execute a first operation and, after the first operation of the first apparatus, to instruct the second apparatus to execute a second operation, the first operation of the first apparatus including transmitting target data to the information processing apparatus, the second operation of the second apparatus including receiving the target data from the information processing apparatus,
 wherein the computer-readable instructions, when executed by the processor, cause the information processing apparatus to perform:
  receiving a start instruction by the user through the user interface to start the cooperation operation according to cooperation operation information selected from among a plurality of pieces of cooperation operation information stored in a storage device, wherein the cooperation operation information includes a plurality of pieces of apparatus identifying information for identifying a plurality of apparatuses and a plurality of pieces of operation information for identifying operations executed by each of the apparatuses identified by the apparatus identifying information, the cooperation operation information being information identifying an executing sequence of the operations identified by the operation information, wherein the plurality of pieces of apparatus identifying information include first apparatus identifying information for identifying the first apparatus and second apparatus identifying information for identifying the second apparatus;
  acquiring the cooperation operation information, from the storage device, which corresponds to the cooperation operation instructed by the start instruction received through the user interface;
  transmitting, when determining that the start instruction is received, a plurality of pieces of operation instruction information for instructing execution of the operations by each of the apparatuses through the communication interface to each of the apparatuses according to the execution sequence of each of the operations included in the cooperation operation information;
  controlling the display to display a status screen including an executing sequence list that indicates a plurality of apparatus objects being listed in an order identified by the executing sequence, the apparatus objects corresponding to the plurality of pieces of apparatus identifying information included in the cooperation operation information acquired from the storage device, wherein the apparatus objects include at least one of a name of each of the apparatuses, a progressing status indicator that indicates a progressing status of each of the operations executed by each of the apparatuses, and change instruction objects for receiving a change instruction to change the operations to be executed by each of the apparatuses, wherein the apparatus objects include a first apparatus object corresponding to the first apparatus and a second apparatus object corresponding to the second apparatus;
  determining the progressing status of each of the operations executed by each of the apparatuses corresponding to each of the apparatus objects, wherein the progressing status includes at least one of a waiting status, an executing status, and a completed status, wherein the waiting status is an operation status in which the apparatus corresponding to the apparatus object is waiting to receive the operation instruction information, wherein the executing status is an operation status in which the apparatus that received the operation information is executing the operation in accordance with the operation information, wherein the completed status for the first apparatus is an operation status in which the first apparatus that received the operation information completed executing the operation in accordance with the operation information and completed transmitting the target data to the information processing apparatus, wherein the completed status for the second apparatus is an operation status in which the second apparatus that received the operation information completed receiving the target data from the information processing apparatus and completed executing the operation in accordance with the operation information;
  controlling the display to change displaying the change instruction objects included in the apparatus objects in accordance with the progressing status determined for each of the apparatuses;
  receiving the change instruction by the user through the user interface by accepting a touch selection of the change instruction object included in the apparatus objects; and
  changing, when determining that the change instruction is received, the operation or the execution sequence of the operation of the apparatus that corresponds to the apparatus objection including the selected change instruction object,
 wherein, in controlling the display to change displaying the change instruction objects, the computer-readable instructions cause the information processing apparatus to perform:
  controlling the display to display the apparatus objects to include the change instruction objects to be selectable by touch operation through the touchscreen device during a time period in which the progressing status of the operation to be executed by each of the apparatuses is one of the waiting status and the executing status;
  controlling the display to display the first apparatus object to not include the change instruction object in selectable mode in response to determining that the progressing status of the operation to be executed by the first apparatus corresponding to the first apparatus object is the completed status; and
  controlling the display to display the second apparatus object to not include the change instruction object in selectable mode in response to determining that the progressing status of the operation to be executed by the second apparatus corresponding to the second apparatus object is the completed status.

2. The non-transitory computer-readable recording medium according to claim 1, wherein each of the change instruction objects comprises a stop instruction object for receiving a stop instruction to stop the operation to be executed by each of the apparatuses corresponding to each of the change instruction objects, wherein, in controlling the display to display the status screen, the computer-readable instructions cause the information processing apparatus to perform:
controlling the display to display the stop instruction object corresponding to the first apparatus to be selectable through the user interface, until the target data is received from the first apparatus; and
controlling the display to display the stop instruction object corresponding to the second apparatus to be selectable through the user interface, until the target data is transmitted to the second apparatus, and wherein, in changing the operation or in changing the execution sequence of the operation, the computer-readable instructions cause the information processing apparatus to perform:
receiving a selection, by the user through the user interface, of the stop instruction object corresponding to one of the apparatuses;
determining whether the operation instruction information is being transmitted to the apparatus corresponding to the selected stop instruction object;
excluding, from the cooperation operation information, the operation information related to the apparatus corresponding to the selected stop instruction object when determining that the operation instruction information is not yet being transmitted to the apparatus corresponding to the selected stop instruction object; and
transmitting stop instruction information instructing the apparatus corresponding to the selected stop instruction object to stop the operation under execution when determining that the operation instruction information is transmitted to the apparatus corresponding to the selected stop instruction object.

3. The non-transitory computer-readable recording medium according to claim 2, wherein, in controlling the display to display the status screen, the computer-readable instructions cause the information processing apparatus to perform:
determining whether the operation instruction information is being transmitted to the apparatus corresponding to the selected stop instruction object;
controlling the display to display a resumption instruction object in place of the selected stop instruction object when determining that the operation instruction information is not yet transmitted to the apparatus corresponding to the selected stop instruction object, the resumption instruction object being displayed for receiving a resumption instruction to resume the operation to be executed by the apparatus corresponding to the selected stop instruction object;
receiving a selection of the resumption instruction object by the user through the user interface; and
registering the operation information of the apparatus corresponding to the selected resumption instruction object in the cooperation operation information when determining that the selection of the resumption instruction object is received.

4. The non-transitory computer-readable recording medium according to claim 3,
wherein the apparatuses include a plurality of the first apparatuses,
wherein, in controlling the display to display the status screen, the computer-readable instructions cause the information processing apparatus to perform:
controlling the display to display the resumption instruction object corresponding to one of the first apparatuses to be selectable by the user through the user interface until the target data is received from all the other first apparatuses; and
controlling the display to display the resumption instruction object corresponding to the one of the first apparatuses to be unselectable by the user after the target data is received from all the other first apparatuses.

5. The non-transitory computer-readable recording medium according to claim 2, wherein, in controlling the display to display the status screen, the computer-readable instructions cause the information processing apparatus to perform:
determining whether the operation instruction information is transmitted to the apparatus corresponding to the selected stop instruction object;
controlling the display to display a resumption instruction object in place of the selected stop instruction object when determining that the operation instruction information is transmitted to the apparatus corresponding to the selected stop instruction object, the resumption instruction object being displayed for receiving a resumption instruction to resume the operation to be executed by the apparatus corresponding to the selected stop instruction object;
receiving a selection of the resumption instruction object by the user through the user interface; and
transmitting resumption instruction information through the communication interface to the apparatus corresponding to the selected resumption instruction object when determining that the selection of the resumption instruction object is received, the resumption instruction information instructing the apparatus corresponding to the selected resumption instruction object to resume the operation to be executed by the apparatus corresponding to the selected stop instruction object.

6. The non-transitory computer-readable recording medium according to claim 5,
wherein the apparatuses include a plurality of the first apparatuses,
wherein, in controlling the display to display the status screen, the computer-readable instructions cause the information processing apparatus to perform:
controlling the display to display the resumption instruction object corresponding to one of the first apparatuses to be selectable by the user through the user interface until the target data is received from all the other first apparatuses; and
controlling the display to display the resumption instruction object corresponding to the one of the first apparatuses to be unselectable by the user after the target data is received from all the other first apparatuses.

7. The non-transitory computer-readable recording medium according to claim 2,
wherein the information processing apparatus comprises a storage capable of storing the target data, and
wherein, in controlling the display to display the status screen, the computer-readable instructions cause the information processing apparatus to perform:

determining whether the selected stop instruction object corresponds to the first apparatus from which the target data is received;
controlling the display to display a deletion instruction object being displayed for receiving a deletion instruction to delete the target data received from the first apparatus when determining that the selected stop instruction object corresponds to the first apparatus to which the operation instruction information is transmitted or when determining that the selected stop instruction object corresponds to the first apparatus from which the target data is received;
receiving a selection, by the user through the user interface, of the deletion instruction object; and
deleting the target data received from the first apparatus from the storage when determining that the selection of the deletion instruction object is received.

8. The non-transitory computer-readable recording medium according to claim 2,
wherein the apparatuses include a plurality of the first apparatuses,
wherein the computer-readable instructions cause the information processing apparatus to perform:
stopping to transmit the operation instruction information to the second apparatus when determining that the selection of the stop instruction object corresponding to all the first apparatuses is received.

9. The non-transitory computer-readable recording medium according to claim 2,
wherein the apparatuses include a plurality of the first apparatuses and a plurality of the second apparatuses,
wherein the computer-readable instructions cause the information processing apparatus to perform:
transmitting the stop instruction information to all the first apparatuses by which the first operation is being executed when determining that the selection of the stop instruction object corresponding to all the second apparatuses is received.

10. The non-transitory computer-readable recording medium according to claim 2, wherein, in controlling the display to display the status screen, the computer-readable instructions cause the information processing apparatus to perform:
determining whether the cooperation operation information includes only one of the first apparatuses or only one of the second apparatuses; and
controlling the display to display the operation instruction object to be unselectable by the user when determining that the cooperation operation information includes only one of the first apparatuses or only one of the second apparatuses.

11. The non-transitory computer-readable recording medium according to claim 1,
wherein the change instruction object comprises a correction instruction object for receiving a correction of the operation to be executed by the corresponding apparatus,
wherein, in controlling the display to display the status screen, the computer-readable instructions cause the information processing apparatus to perform:
receiving a selection, by the user through the user interface, of the correction instruction object;
controlling the display to display a correction reception screen in place of the status screen when determining that the selection of the correction instruction object is received, the correction reception screen being displayed for receiving a correction operation by the user through the user interface to input a corrected operation;
controlling the display to display the status screen in place of the correction reception screen when determining that the correction operation is received;
controlling the display to display the correction instruction object to be unselectable by the user when determining that the operation instruction information is transmitted to the apparatus corresponding to the correction instruction object;
changing the operation to be executed by the apparatus corresponding to the selected correction instruction object in the cooperation operation information to the corrected operation; and
suspending transmission of the operation instruction information to the apparatus corresponding to the selected correction instruction object until finish displaying the correction reception screen.

12. The non-transitory computer-readable recording medium according to claim 1,
wherein the information processing apparatus comprises a storage,
wherein the computer-readable instructions cause the information processing apparatus to perform:
storing a plurality of pieces of the cooperation operation information that is input by the user through the user interface in the storage in association with cooperation operation identification information that identifies each of the pieces of the cooperation operation information; and
receiving a selection of the cooperation operation information by the user through the user interface; and
wherein, in the acquiring the cooperation operation information, the computer-readable instructions cause the information processing apparatus to perform:
acquiring the selected cooperation operation information from the storage.

13. The non-transitory computer-readable recording medium according to claim 1,
wherein the apparatuses include a plurality of the first apparatuses and a plurality of the second apparatuses, and
wherein the computer-readable instructions cause the information processing apparatus to perform:
transmitting the operation instruction information through the communication interface to the respective first apparatuses; and
transmitting the operation instruction information through the communication interface to the respective second apparatuses when the target data is received from all of the first apparatuses.

14. The non-transitory computer-readable recording medium according to claim 1, wherein the computer-readable instructions, when executed by the processor, cause the information processing apparatus to perform:
in response to receiving the change instruction by the user through the user interface by accepting a touch selection of the change instruction object included in the first apparatus object to cancel execution of the first operation by the first apparatus while the progressing status of the first operation is the waiting status,
deleting the operation information that identifies the first operation from the cooperation operation information,
changing the progressing status of the first apparatus object to a cancelled status, wherein the cancelled status is an operation status in which the operation to be executed by the apparatus is cancelled, and controlling the display to change displaying the change instruction object included in the first apparatus object to indicate that the first operation is resumable; and in response to receiving the change instruction by the user through the user interface by accepting a touch selection of the change instruction object included in the first apparatus object to cancel execution of the first operation by the first apparatus while the progressing status of the first operation is the executing status, transmitting stop instruction information to the first apparatus, the stop instruction information being information for enabling the first apparatus to stop executing the first operation, changing the progressing status of the first apparatus object to a suspended status, wherein the suspended status is an operation status in which the operation to be executed by the apparatus is suspended, and controlling the display to change displaying the change instruction object included in the first apparatus object to indicate that the first operation is resumable or deletable.

15. The non-transitory computer-readable recording medium according to claim 14, wherein the computer-readable instructions, when executed by the processor, cause the information processing apparatus to perform:

in response to receiving the change instruction by the user through the user interface by accepting a touch selection of the change instruction object included in the first apparatus object to resume execution of the first operation by the first apparatus while the progressing status of the first operation is the waiting status, adding the operation information for identifying the first operation to the cooperation operation information, changing the progressing status of the first apparatus object from the cancelled status to the waiting status, and controlling the display to change displaying the change instruction object included in the first apparatus object to indicate that the first operation is able to be cancelled; and in response to receiving the change instruction by the user through the user interface by accepting a touch selection of the change instruction object included in the first apparatus object to resume execution of the first operation by the first apparatus while the progressing status of the first operation is the executing status, transmitting resumption instruction information to the first apparatus, the resumption instruction information being information for enabling the first apparatus to resume the first operation being suspended, changing the progressing status of the first apparatus object from the suspended status to the waiting status, and controlling the display to change displaying the change instruction object included in the first apparatus object to indicate that the first operation is resumable or deletable.

16. The non-transitory computer-readable recording medium according to claim 1, wherein the computer-readable instructions, when executed by the processor, cause the information processing apparatus to perform:

in response to receiving the change instruction by the user through the user interface by accepting a touch selection of the change instruction object included in the second apparatus object to cancel execution of the second operation by the second apparatus while the progressing status of the second operation is the waiting status, deleting the operation information that identifies the second operation from the cooperation operation information, changing the progressing status of the second apparatus object to a cancelled status, wherein the cancelled status is an operation status in which the operation to be executed by the apparatus is cancelled, and controlling the display to change displaying the change instruction object included in the second apparatus object to indicate that the second operation is resumable; and in response to receiving the change instruction by the user through the user interface by accepting a touch selection of the change instruction object included in the second apparatus object to cancel execution of the second operation by the second apparatus while the progressing status of the second operation is the executing status, transmitting stop instruction information to the second apparatus, the stop instruction information being information for enabling the second apparatus to stop executing the second operation, changing the progressing status of the second apparatus object to a suspended status, wherein the suspended status is an operation status in which the operation to be executed by the apparatus is suspended, and controlling the display to change displaying the change instruction object included in the second apparatus object to indicate that the second operation is resumable or deletable.

17. The non-transitory computer-readable recording medium according to claim 16, wherein the computer-readable instructions, when executed by the processor, cause the information processing apparatus to perform:

in response to receiving the change instruction by the user through the user interface by accepting a touch selection of the change instruction object included in the second apparatus object to resume execution of the second operation by the second apparatus while the progressing status of the second operation is the waiting status, adding the operation information for identifying the second operation to the cooperation operation information, changing the progressing status of the second apparatus object from the cancelled status to the waiting status, and controlling the display to change displaying the change instruction object included in the second apparatus object to indicate that the second operation is able to be cancelled; and in response to receiving the change instruction by the user through the user interface by accepting a touch selection of the change instruction object included in the second apparatus object to resume execution of the second operation by the second apparatus while the progressing status of the second operation is the executing status, transmitting resumption instruction information to the second apparatus, the resumption instruction information being information for enabling the second apparatus to resume the second operation being suspended, changing the progressing status of the second apparatus object from the suspended status to the waiting status, and controlling the display to change displaying the change instruction object included in the second apparatus object to indicate that the second operation is resumable or deletable.

18. An information processing apparatus being configured as a portable device, the information processing apparatus comprising:

a processor;

a touchscreen device including a display and a user interface that receives an operation by a user;

a communication interface that communicates wirelessly with a plurality of apparatuses including a first apparatus and a second apparatus; and memory storing computer-readable instructions, when executed by the processor, causing the information processing apparatus to perform a cooperation operation to instruct the first apparatus to execute a first operation and, after the first operation of the first apparatus, to instruct the second apparatus to execute a second operation, the first operation of the first apparatus including transmitting target data to the information processing apparatus, the second operation of the second apparatus including receiving the target data from the information processing apparatus, the cooperation operation comprising:

receiving a start instruction by the user through the user interface to start the cooperation operation according to cooperation operation information selected from among a plurality of pieces of cooperation operation information stored in a storage device, wherein the cooperation operation information includes a plurality of pieces of apparatus identifying information for identifying a plurality of apparatuses and a plurality of pieces of operation information for identifying operations executed by each of the apparatuses identified by the apparatus identifying information, the cooperation operation information being information identifying an executing sequence of the operations identified by the operation information, wherein the plurality of pieces of apparatuses identifying information includes a first apparatus identifying information for identifying the first apparatus and a second apparatus identifying information for identifying the second apparatus;

acquiring the cooperation operation information, from the storage device, which corresponds to the cooperation operation instructed by the start instruction received through the user interface;

transmitting, when determining that the start instruction is received, a plurality of pieces of operation instruction information for instructing execution of the operations by each of the apparatuses through the communication interface to each of the apparatuses according to the execution sequence of each of the operations included in the cooperation operation information;

controlling the display to display a status screen including an executing sequence list that indicates a plurality of apparatus objects—being listed in an order identified by the executing sequence, the apparatus objects corresponding to the plurality of pieces of apparatus identifying information included in the cooperation operation information acquired from the storage device, wherein the apparatus objects includes at least one of a name of each of the apparatuses, a progressing status indicator that indicates a progressing status of each of the operations executed by each of the apparatuses, and change instruction objects for receiving a change instruction to change the operations to be executed by each of the apparatuses, wherein the apparatus objects include a first apparatus object corresponding to the first apparatus and a second apparatus object corresponding to the second apparatus;

determining the progressing status of each of the operations executed by each of the apparatuses corresponding to each of the apparatus objects, wherein the progressing status includes at least one of a waiting status, an executing status, and a completed status, wherein the waiting status is an operation status in which the apparatus corresponding to the apparatus object is waiting to receive the operation instruction, wherein the executing status is an operation status in which the apparatus that received the operation information is executing the operation in accordance with the operation information, wherein the completed status for the first apparatus is an operation status in which the first apparatus that received the operation information completed executing the operation in accordance with the operation information and completed transmitting the target data to the information processing apparatus, wherein the completed status for the second apparatus is an operation status in which the second apparatus that received the operation information completed receiving the target data from the information processing apparatus and completed executing the operation in accordance with the operation information;

controlling the display to change displaying the change instruction objects included in the apparatus objects in accordance with the progressing status determined for each of the apparatuses;

receiving the change instruction by the user through the user interface by accepting a touch selection of the change instruction object included in the apparatus objects; and changing, when determining that the change instruction is received, the operation or the execution sequence of the operation of the apparatus that corresponds to the apparatus object including the selected change instruction object, wherein, in controlling the display to change displaying the change instruction objects, the computer-readable instructions cause the information processing apparatus to perform:

controlling the display to display the apparatus objects to include the change instruction objects to be selectable by touch operation through the touchscreen device during a time period in which the progressing status of the operation to be executed by each of the apparatuses is one of the waiting status and the executing status;

controlling the display to display the first apparatus object to not include the change instruction object in selectable mode in response to determining that the progressing status of the operation to be executed by the first apparatus corresponding to the first apparatus object is the completed status; and controlling the display to display the second apparatus object to not include the change instruction object in selectable mode in response to determining that the progressing status of the operation to be executed by the second apparatus corresponding to the second apparatus object is the completed status.

19. A cooperation system comprising:

a first apparatus selected from among a plurality of apparatuses;

a second apparatus selected from among the apparatuses; and an information processing apparatus that controls a cooperation operation that is executed in cooperation with the first apparatus and the second apparatus, the information processing apparatus being configured as a portable device, wherein the cooperation operation includes instructions for the first apparatus to execute a first operation and, after the first operation of the first apparatus, instructions for the second apparatus to execute a second operation, the first operation of the first apparatus including wirelessly transmitting target data to the information processing apparatus, the second operation of the second apparatus including wirelessly receiving the target data from the information processing apparatus, and wherein the information processing apparatus comprises:
a processor;
a touchscreen device including a display and a user interface that receives an operation by a user;
a communication interface that wirelessly communicates with a plurality of apparatuses including a first apparatus and a second apparatus; and
memory storing computer-readable instructions, when executed by the processor, causing the information processing apparatus to perform:
receiving a start instruction by the user through the user interface to start the cooperation operation according to cooperation operation information selected from among a plurality of pieces of cooperation operation information stored in a storage device, wherein the cooperation operation information includes a plurality of pieces of apparatus identifying information for identifying a plurality of apparatuses and a plurality of pieces of operation information for identifying operations executed by each of the apparatuses identified by the apparatus identifying information, the cooperation operation information being information identifying an executing sequence of the operations identified by the operation information, wherein the plurality of pieces of apparatus identifying information include a first apparatus identifying information for identifying the first apparatus and a second apparatus identifying information for identifying the second apparatus;
acquiring the cooperation operation information, from the storage device, which corresponds to the cooperation operation instructed by the start instruction received through the user interface;
transmitting, when determining that the start instruction is received, a plurality of pieces of operation instruction information for instructing execution of the operations by each of the apparatuses through the communication interface to each of the apparatuses according to the execution sequence of each of the operations included in the cooperation operation information;
controlling the display to display a status screen including an executing sequence list that indicates a plurality of apparatus objects being listed in an order identified by the executing sequence, the apparatus objects corresponding to the plurality of pieces of apparatus identifying information included in the cooperation operation information acquired from the storage device, wherein the apparatus objects includes at least one of a name of each of the apparatuses, a progressing status indicator that indicates a progressing status of each of the operations executed by each of the apparatuses, and change instruction objects for receiving a change instruction to change the operations to be executed by each of the apparatuses, wherein the apparatus objects include a first apparatus object corresponding to the first apparatus and a second apparatus object corresponding to the second apparatus;
determining the progressing status of each of the operations executed by each of the apparatuses corresponding to each of the apparatus objects, wherein the progressing status includes at least one of a waiting status, an executing status, and a completed status, wherein the waiting status is an operation status in which the apparatus corresponding to the apparatus object is waiting to receive the operation instruction, wherein the executing status is an operation status in which the apparatus that received the operation information is executing the operation in accordance with the operation information, wherein the completed status for the first apparatus is an operation status in which the first apparatus that received the operation information completed executing the operation in accordance with the operation information and completed transmitting the target data to the information processing apparatus, wherein the completed status for the second apparatus is an operation status in which the second apparatus that received the operation information completed receiving the target data from the information processing apparatus and completed executing the operation in accordance with the operation information;
controlling the display to change displaying the change instruction objects included in the apparatus objects in accordance with the progressing status determined for each of the apparatuses;
receiving the change instruction by the user through the user interface by accepting a touch selection of the change instruction object included in the apparatus objects; and
changing, when determining that the change instruction is received, the operation or the execution sequence of the operation of the apparatus that corresponds to the apparatus object including the selected change instruction object,
wherein, in controlling the display to change displaying the change instruction objects, the computer-readable instructions cause the information processing apparatus to perform:
controlling the display to display the apparatus objects to include the change instruction objects to be selectable by touch operation through the touchscreen device during a time period in which the progressing status of the operation to be executed by each of the apparatuses is one of the waiting status and the executing status;

controlling the display to display the first apparatus object to not include the change instruction object in selectable mode in response to determining that the progressing status of the operation to be executed by the first apparatus corresponding to the first apparatus object is the completed status; and controlling the display to display the second apparatus object to not include the change instruction object in selectable mode in response to determining that the progressing status of the operation to be executed by the second apparatus corresponding to the second apparatus object is the completed status.

* * * * *

UNITED STATES PATENT AND TRADEMARK OFFICE
CERTIFICATE OF CORRECTION

PATENT NO. : 9,594,528 B2
APPLICATION NO. : 14/754872
DATED : March 14, 2017
INVENTOR(S) : Norihiko Asai It is certified that error appears in the above-identified patent and that said Letters Patent is hereby corrected as shown below:

In the Claims

In Column 31, Claim 18, Line 65:
Please delete "objects-being" and insert --objects being--

Signed and Sealed this
Tenth Day of October, 2017

Joseph Matal
*Performing the Functions and Duties of the*
*Under Secretary of Commerce for Intellectual Property and*
*Director of the United States Patent and Trademark Office*